US011985049B2

(12) United States Patent
Dahu et al.

(10) Patent No.: US 11,985,049 B2
(45) Date of Patent: May 14, 2024

(54) METHOD AND SYSTEM FOR GUARANTEEING SERVICE APPLICATION EXPERIENCE

(71) Applicant: Huawei Technologies Co., Ltd., Shenzhen (CN)

(72) Inventors: Bayaer Dahu, Beijing (CN); Guodong Liu, Nanjing (CN); Jikun Ding, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/185,963

(22) Filed: Mar. 17, 2023

(65) Prior Publication Data

US 2023/0224228 A1 Jul. 13, 2023

Related U.S. Application Data

(63) Continuation of application No. PCT/CN2021/116342, filed on Sep. 3, 2021.

(30) Foreign Application Priority Data

Sep. 18, 2020 (CN) .......................... 202010989381.6

(51) Int. Cl.
 *H04L 41/5019* (2022.01)
(52) U.S. Cl.
 CPC ................ *H04L 41/5019* (2013.01)
(58) Field of Classification Search
 None
 See application file for complete search history.

(56) References Cited

U.S. PATENT DOCUMENTS

| 2014/0098740 | A1* | 4/2014 | Xing ...................... H04W 4/50 370/328 |
| 2016/0218918 | A1* | 7/2016 | Chu ........................ H04L 41/12 |
| 2016/0330286 | A1* | 11/2016 | Keith ...................... H04L 67/63 |
| 2017/0048755 | A1* | 2/2017 | Lu ......................... H04W 72/543 |
| 2017/0280474 | A1* | 9/2017 | Vesterinen ............ H04W 28/22 |

FOREIGN PATENT DOCUMENTS

CN 101841456 B 7/2012

* cited by examiner

*Primary Examiner* — Joshua Joo
(74) *Attorney, Agent, or Firm* — Slater Matsil, LLP

(57) ABSTRACT

A controller groups a plurality of service application types into a plurality of application type groups based on link quality requirements of the plurality of service application types in a network. Sending priorities are determined based on the plurality of application type groups. The controller separately determines at least one link for the plurality of application type groups based on link quality requirements of the plurality of application type groups and link quality information of a plurality of links in the network. The controller separately determines network configurations for the plurality of application type groups based on the at least one link separately determined for the plurality of application type groups, the sending priorities of the plurality of application type groups, the link quality requirements of the plurality of application type groups, and a policy recommendation engine. The network configurations are delivered to a policy execution point device.

20 Claims, 7 Drawing Sheets

METHOD AND SYSTEM FOR GUARANTEEING SERVICE APPLICATION EXPERIENCE

CROSS-REFERENCE TO RELATED APPLICATIONS

This application is a continuation of International Application No. PCT/CN2021/116342, filed on Sep. 3, 2021, which claims priority to Chinese Patent Application No. 202010989381.6, filed on Sep. 18, 2020. The disclosures of the aforementioned applications are hereby incorporated by reference in their entireties.

TECHNICAL FIELD

This application relates to the field of communications technologies, and in particular, to a method for guaranteeing service application experience.

BACKGROUND

As enterprise services become increasingly cloud-based, enterprise users focus on service quality and experience instead of network connectivity. Service quality and experience guarantee has gradually become a major indicator for network operation and maintenance personnel. Network device providers also provide features such as QoS (Quality of Service) and policy-based routing to provide a preferential forwarding guarantee means for important services. Enterprise networks have a plurality of service applications. Network operation and maintenance personnel need to set a corresponding experience guarantee policy for each service application. Currently, network operation and maintenance personnel often need to manually configure policies. Operation and maintenance personnel need to configure different policies for different applications. Parameter settings in policies are complex, operation and maintenance workload is heavy, and experience of key service applications cannot be guaranteed.

SUMMARY

Embodiments of this application provide a method and a system for guaranteeing service application experience, to resolve a problem in the conventional technology that a service application experience guarantee effect is poor due to low service application policy configuration efficiency.

According to a first aspect, an embodiment of this application provides a method for guaranteeing service application experience, and the method includes:

A controller groups a plurality of service application types into a plurality of application type groups based on link quality requirements of the plurality of service application types; determines sending priorities based on the plurality of application type groups; separately determines at least one link for the plurality of application type groups based on link quality requirements of the plurality of application type groups and link quality information of a plurality of links in a network; separately determines network configurations for the plurality of application type groups based on the at least one link separately determined for the plurality of application type groups, the sending priorities of the plurality of application type groups, the link quality requirements of the plurality of application type groups, and a configuration decision engine; and delivers the network configurations to a policy execution point device.

In the foregoing technical solution, the link quality requirements of the plurality of service application types belong to a part of quality requirements of the plurality of service application types, and refer to quality requirements of data packets of the plurality of service application types on a transmission link. Quality of the transmission link affects a transmission effect of the data packets of the plurality of service application types, and further affects user experience of the plurality of service application types. In the foregoing technical solution, the link quality requirement is quantitatively measured by using a measurement indicator of the link quality requirement. The measurement indicator of the link quality requirement refers to one or more values or one or more value ranges that can measure the quality requirements of the plurality of service application types and the plurality of application type groups for the transmission link. The measurement indicator of the link quality requirement may include: a bandwidth, a packet loss rate, a jitter, a delay, and/or a comprehensive measurement indicator. For the plurality of service application types in the network, the link quality requirements of the plurality of service application types may be obtained according to meanings and calculation methods of measurement indicators of the link quality requirement. With reference to degrees of the plurality of service application types in the network on the link quality requirements, the plurality of service application types may be grouped into a plurality of application type groups. Therefore, the plurality of service application types may be grouped into at least one application type group. When operation and maintenance personnel need to perform network configuration such as data packet sending and experience guarantee on the plurality of service application types, the network configuration such as data packet sending and experience guarantee may be performed based on the plurality of application type groups of the plurality of service application types. Compared with the conventional technology, that is, a method and a technology for performing network configuration for each service application type, this method can improve network configuration efficiency of a service application and reduce operation and maintenance costs. Further, data packet sending priorities are set for the plurality of application type groups. In this method, a data packet sending priority does not need to be set for each service application type, and network configuration efficiency is also improved.

Because user experience of the plurality of service application types in the plurality of application type groups in the network depends on quality of a physical link responsible for sending data packets of the plurality of service application types, operation and maintenance personnel need to select a link that satisfies the link quality requirements of the plurality of application type groups to send the data packets and form a network configuration by using the link. The controller can obtain link quality information of a plurality of links in the network in real time or periodically from a device or a system that support link quality monitoring; and separately determines at least one link for the plurality of application type groups based on the link quality requirements of the plurality of application type groups and the link quality information. Satisfaction degrees of the plurality of links for the link quality requirements of the plurality of application type groups may be obtained by comparing measurement indicators of the link quality requirements of the plurality of application type groups with the link quality information of the plurality of links. The quality satisfaction degrees of the plurality of links further need to be marked. For a link whose link quality satisfaction degree is satisfied, it indicates that the link can satisfy a link quality requirement of at least one application type group; and for a link whose link quality satisfaction degree is not satisfied, it indicates that the link does not satisfy link quality requirements of all the plurality of application type groups. For a link marked as not satisfied, the link marked as not satisfied may be further marked with a proximity degree based on a proximity degree between link quality information of the link and the measurement indicators of the link quality requirements of the plurality of application type groups. "Satisfied" and "not satisfied" link information of the plurality of application type groups may be obtained by using the foregoing method. Further, network configurations are separately determined for the plurality of application type groups based on the at least one link separately determined for the plurality of application type groups, the sending priorities of the plurality of application type groups, the link quality requirements of the plurality of application type groups, and a configuration decision engine. Based on an operation of the configuration decision engine, the controller may automatically separately determine the network configurations for the plurality of application type groups based on the at least one link separately determined for the plurality of application type groups, the sending priorities of the plurality of application type groups, and the link quality requirements of the plurality of application type groups. This method can improve network configuration efficiency of operation and maintenance personnel in a service application, improve correctness of network configuration parameter selection, and ensure service application experience. Finally, the network configurations are delivered to the policy execution point device.

In a possible design, the method further includes: grouping the plurality of service application types into the plurality of application type groups based on the link quality requirements of the plurality of service application types and a correspondence between the plurality of application type groups and the link quality requirements of the plurality of application type groups. For the plurality of service application types in the network, the link quality requirements of the plurality of service application types may be obtained according to meanings and calculation methods of measurement indicators of the link quality requirement. With reference to degrees of the plurality of service application types in the network on the link quality requirements, the plurality of service applications may be grouped into a plurality of application type groups. Therefore, the plurality of service application types may be aggregated into at least one application type group. Specifically, the application type groups of the plurality of service application types may be determined based on the link quality requirements of the plurality of service application types and a correspondence between the plurality of application type groups and the link quality requirements of the plurality of application type groups. That is, the application type groups corresponding to the plurality of service applications may be determined by comparing the measurement indicators of the link quality requirements of the plurality of service application types with the correspondence between the plurality of application type groups and the measurement indicators of the link quality requirements of the plurality of application type groups.

In a possible design, the method further includes: grouping the plurality of service application types into the plurality of application type groups based on the link quality requirements and user experience requirements of the plurality of service application types and a correspondence between the plurality of application type groups and the link quality requirements and user experience requirements of the plurality of application type groups. The user experience requirement of the service application type also belongs to a part of the quality requirement of the service application type, and refers to an experience requirement that describes the service application type from a perspective of user perception. The controller may quantitatively measure the user experience requirement by using a measurement indicator of the user experience requirement. The measurement indicator of the user experience requirement refers to one or more values or one or more value ranges of an indicator that can measure experience of the service application type from the perspective of user perception. For a plurality of service application types in the network, user experience requirements of the plurality of service application types may be obtained by using meanings and calculation methods of measurement indicators of the user experience requirements. With reference to link quality requirements and user experience requirements of a plurality of service application types in the network, the plurality of service application types may be grouped into a plurality of application type groups, and the plurality of service application types are aggregated into at least one application type group. Specifically, the application type groups of the plurality of service application types may be determined based on the link quality requirements and the user experience requirements of the plurality of service application types and the correspondence between the plurality of application type groups and the link quality requirements and the user experience requirements of the plurality of application type groups. That is, the application type groups corresponding to the plurality of service application types may be determined by comparing the measurement indicators of the link quality requirements and the measurement indicators of the user experience requirements of the plurality of service application types with the correspondence between the plurality of application type groups and the measurement indicators of the link quality requirements and the measurement indicators of the user experience requirements of the plurality of application type groups. Further, in a process of comparing the quality requirements of the plurality of application types with the quality requirements of the plurality of application type groups, an objective of increasing the user experience requirement may reflect a user experience requirement degree in a service application type group, and further, grouping of the service application types may be more accurate.

In a possible design, the method further includes: separately determining the network configurations for the plurality of application type groups based on the at least one link separately determined for the plurality of application type groups, the sending priorities of the plurality of application type groups, the link quality requirements of the plurality of application type groups, user experience requirements of the plurality of application type groups, cost requirements of the plurality of links, and the configuration decision engine. Based on an operation of the configuration decision engine, the controller may automatically separately determine the network configurations for the plurality of application type groups based on the at least one link separately determined for the plurality of application type groups, the sending priorities of the plurality of application type groups, the link quality requirements of the plurality of application type groups, the user experience requirements of the plurality of application type groups, and costs of the plurality of links. This method can improve network configuration efficiency of operation and maintenance personnel in a service application, improve correctness of network configuration parameter selection, and ensure service application experience.

In a possible design, the method further includes: determining, based on link quality information of links involved in the network configurations separately determined for the plurality of application type groups, whether execution effects of the network configurations are capable of satisfying the link quality requirements of the plurality of application type groups; and separately determining, when the execution effects of the network configurations are incapable of satisfying the link quality requirements of the plurality of application type groups, new network configurations for the plurality of application type groups based on the at least one link separately determined for the plurality of application type groups, the sending priorities of the plurality of application type groups, the link quality requirements of the plurality of application type groups, and the configuration decision engine. The controller may monitor quality information of the plurality of links in the network in real time or periodically, and refresh marks of satisfaction degrees of the links for the link quality requirements of the plurality of application type groups. When it is found that after the network configuration is delivered, a satisfaction degree of a link involved in the network configuration is marked as not satisfied, this means that link quality of the link has deteriorated, and a link quality requirement of a corresponding application type group cannot be satisfied, which affects experience of a service application of the application type group. In this case, the network configuration needs to be adjusted based on a current link status. New network configurations are separately determined for the plurality of application type groups based on the at least one link separately determined for the plurality of application type groups, the sending priorities of the plurality of application type groups, the link quality requirements of the plurality of application type groups, and the configuration decision engine.

In a possible design, the method further includes: determining, based on the link quality information of the links involved in the network configurations separately determined for the plurality of application type groups and user experience information of a plurality of service applications of the plurality of application types, whether the execution effects of the network configurations are capable of satisfying the link quality requirements and user experience requirements of the plurality of application type groups. The controller may monitor the quality information of the plurality of links in the network and the user experience information of the plurality of service applications in the plurality of application type groups in real time or periodically, refresh marks of satisfaction degrees of the links for the link quality requirements of the plurality of application type groups, compare the user experience information of the plurality of service applications of the plurality of application type groups with the user experience requirements of the plurality of application type groups in real time or periodically, and determine whether execution effects of the network configurations can satisfy the link quality requirements and the user experience requirements of the plurality of application type groups.

In a possible design, the method further includes: when the execution effects of the network configurations are incapable of satisfying the link quality requirements and user experience requirements of the plurality of application type groups, separately determining new network configurations for the plurality of application type groups based on the at least one link separately determined for the plurality of application type groups, the sending priorities of the plurality of application type groups, the link quality requirements of the plurality of application type groups, and the configuration decision engine. When the controller finds that after the network configuration is delivered, a satisfaction degree of a link involved in the network configuration is marked as not satisfied and/or a user experience requirement cannot be satisfied, this means that link quality of the link has deteriorated and/or user experience has deteriorated, and a link quality requirement of a corresponding application type group cannot be satisfied, which affects experience of a service application of the application type group. In this case, the network configuration needs to be adjusted based on a current link status. New network configurations are separately determined for the plurality of application type groups based on the at least one link separately determined for the plurality of application type groups, the sending priorities of the plurality of application type groups, the link quality requirements of the plurality of application type groups, and the configuration decision engine.

In a possible design, the method further includes: separately determining new network configurations for the plurality of application type groups based on the at least one link separately determined for the plurality of application type groups, the sending priorities of the plurality of application type groups, the link quality requirements of the plurality of application type groups, user experience requirements of the plurality of application type groups, cost requirements of the plurality of links, and the configuration decision engine. Further, based on an operation of the configuration decision engine, the controller may request to automatically separately determine the network configurations for the plurality of application type groups based on the at least one link separately determined for the plurality of application type groups, the sending priorities of the plurality of application type groups, the link quality requirements of the plurality of application type groups, the user experience requirements of the plurality of application type groups, and the costs of the plurality of links. Link cost requirements are added to input conditions of a recommendation engine, helping operation and maintenance personnel make decisions among link cost requirements, link quality, and user experience. This method can improve network configuration efficiency of operation and maintenance personnel in a service application, improve correctness of network configuration parameter selection, and ensure service application experience.

According to a second aspect, an embodiment of this application provides a system for guaranteeing service application experience, where the system includes an application grouping module, an experience monitoring module, a configuration decision module, and a configuration validation module. The application grouping module is configured to group a plurality of service application types into a plurality of application type groups based on link quality requirements of the plurality of service application types; and further configured to determine sending priorities based on the plurality of application type groups; the experience monitoring module is configured to separately determine at least one link for the plurality of application type groups based on the link quality requirements of the plurality of application type groups and link quality information of a plurality of links in a network; the configuration decision module is configured to separately determine network configurations for the plurality of application type groups based on the at least one link separately determined for the plurality of application type groups, the sending priorities of the plurality of application type groups, the link quality requirements of the plurality of application type groups, and a configuration decision engine; and the configuration validation module is configured to deliver the network configurations to a policy execution module.

In a possible design, the system further includes the application grouping module, configured to group the plurality of service application types into the plurality of application type groups based on the link quality requirements of the plurality of service application types and a correspondence between the plurality of application type groups and the link quality requirements of the plurality of application type groups.

In a possible design, the system further includes the application grouping module, configured to: group the plurality of service application types into the plurality of application type groups based on the link quality requirements and user experience requirements of the plurality of service application types and a correspondence between the plurality of application type groups and the link quality requirements and user experience requirements of the plurality of application type groups.

In a possible design, the system further includes the configuration decision module, configured to: separately determine the network configurations for the plurality of application type groups based on the at least one link separately determined for the plurality of application type groups, the sending priorities of the plurality of application type groups, the link quality requirements of the plurality of application type groups, user experience requirements of the plurality of application type groups, cost requirements of the plurality of links, and the configuration decision engine.

In a possible design, the system further includes the experience monitoring module, configured to: determine, based on link quality information of links involved in the network configurations separately determined for the plurality of application type groups, whether execution effects of the network configurations are capable of satisfying the link quality requirements of the plurality of application type groups; and the configuration decision module, configured to: separately determine, when the execution effects of the network configurations are incapable of satisfying the link quality requirements of the plurality of application type groups, new network configurations for the plurality of application type groups based on the at least one link separately determined for the plurality of application type groups, the sending priorities of the plurality of application type groups, the link quality requirements of the plurality of application type groups, and the configuration decision engine.

In a possible design, the system further includes the experience monitoring module, configured to: determine, based on the link quality information of the links involved in the network configurations separately determined for the plurality of application type groups and user experience information of a plurality of service applications of the plurality of application types, whether the execution effects of the network configurations are capable of satisfying the link quality requirements and the user experience requirements of the plurality of application type groups.

In a possible design, the system further includes the configuration decision module, configured to: when the execution effects of the network configurations are incapable of satisfying the link quality requirements and the user experience requirements of the plurality of application type groups, separately determine new network configurations for the plurality of application type groups based on the at least one link separately determined for the plurality of application type groups, the sending priorities of the plurality of application type groups, the link quality requirements of the plurality of application type groups, and the configuration decision engine.

In a possible design, the system further includes the configuration decision module, configured to: separately determine new network configurations for the plurality of application type groups based on the at least one link separately determined for the plurality of application type groups, the sending priorities of the plurality of application type groups, the link quality requirements of the plurality of application type groups, the user experience requirements of the plurality of application type groups, cost requirements of the plurality of links, and the configuration decision engine.

DETAILED DESCRIPTION OF ILLUSTRATIVE EMBODIMENTS

To make the objectives, technical solutions, and advantages of this application clearer, the following further describes this application in detail with reference to the accompanying drawings. It is clear that the described embodiments are merely some rather than all of embodiments of this application. All other embodiments obtained by a person of ordinary skill in the art based on embodiments of this application without creative efforts shall fall within the protection scope of this application.

Network architectures and service scenarios described in the embodiments of this application are used as examples to describe the technical solutions of this application, but this does not mean that this application is applicable only to the following embodiments. A person of ordinary skill in the art may know that, with evolution of network architectures and emergence of new service scenarios, the technical solutions provided this application are also applicable to a similar technical problem.

Figure 1:
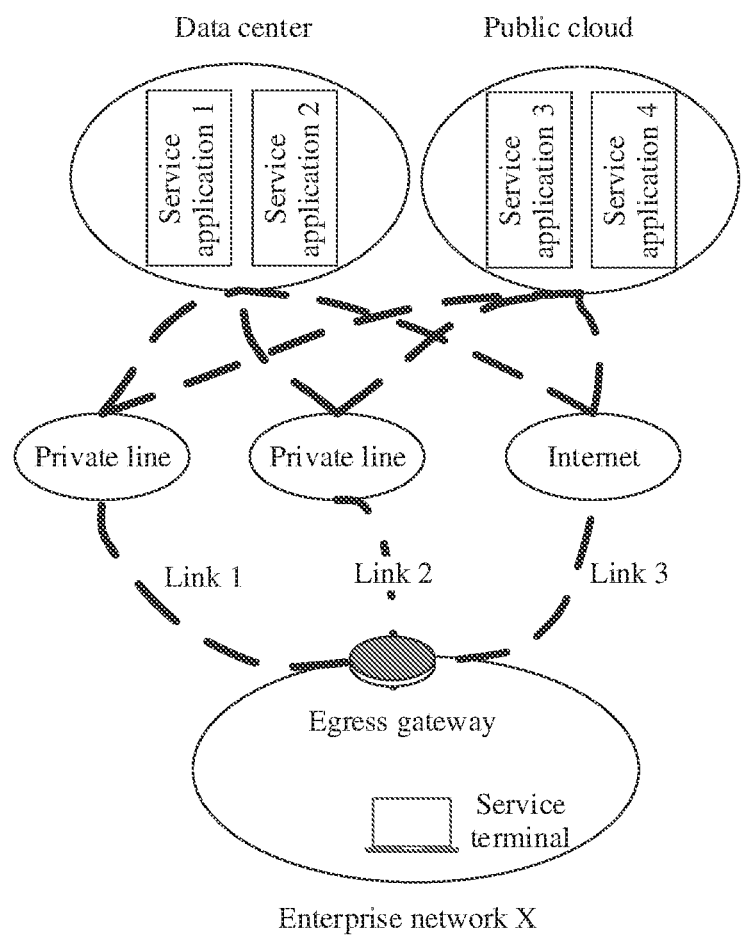
FIG. 1 is a schematic scenario diagram of an enterprise network X of a method for guaranteeing service application experience according to an embodiment of this application.

FIG. 1 is a schematic scenario diagram of an enterprise network X of a method for guaranteeing service application experience according to an embodiment of this application. An application scenario of this application is a scenario in which a service terminal accesses a service application by using a network. With the popularization of cloud storage and cloud computing technologies, more and more service applications are deployed in a data center or a cloud platform in a centralized manner. For example, service applications are centrally deployed in a self-owned data center, an internet data center, or a public cloud platform. As shown in FIG. 1, an enterprise network X deploys an enterprise service application 1 and an enterprise service application 2 in a data center, and deploys an enterprise service application 3 and an enterprise service application 4 on a public cloud platform. A service terminal in the enterprise network X needs to access enterprise service applications in the data center and the public cloud platform. Metropolitan area network links related to the enterprise network X include a link 1, a link 2, and a link 3. The link 1 and the link 2 are obtained by the enterprise by purchasing private line services provided by a network operator. The link 3 is obtained by the enterprise by purchasing a wired internet link service or a mobile internet link service provided by a network operator. When a service terminal in the enterprise network X accesses an enterprise service application deployed in the enterprise data center and public cloud platform, a data packet of the service application is forwarded to an uplink of an egress gateway through an egress gateway device. The uplink of the egress gateway device includes the link 1 and the link 2 that are corresponding to the private lines leased by the enterprise from the operator and the link 3 corresponding to the internet line. Operation and maintenance personnel configure a link selection policy, a routing policy, and a QoS (Quality of Service) policy for service application data on the egress gateway device to transmit the service application data. For example, the service application 1 is an enterprise audio and video conference service, which is a real-time interactive service. If a problem such as packet loss or a delay occurs on the network, service experience will be greatly affected. The service application 1 is a key enterprise service that needs to be guaranteed and needs to be forwarded through the link 1. The service application 3 is an enterprise email service, which does not require high real-time transmission, is a basic enterprise service, and requires high reliability. Therefore, the service application 3 needs to be forwarded through the link 2. There are many similar service applications in the enterprise application scenario, which are not listed here one by one. Similar to the example, for each enterprise application, network operation and maintenance personnel need to configure the foregoing series of policies for the enterprise application to implement data packet transmission and application experience guarantee. Although the egress gateway device already supports application type-based data transmission features such as QoS and policy routing, because there are a large quantity of enterprise services, various types of enterprise services, and various types of experience guarantee policies, and a method for setting a parameter in the policy is complex, it is difficult for operation and maintenance personnel to configure the policy, and there is a heavy workload of policy maintenance. Even if the experience guarantee policy of the service application data is executed, because quality data of an egress link cannot be detected in real time, when the link quality deteriorates suddenly, a service application experience effect is affected. The service application may be even unavailable and a network fault may occur, increasing difficulty in network operation and maintenance.

Figure 2:
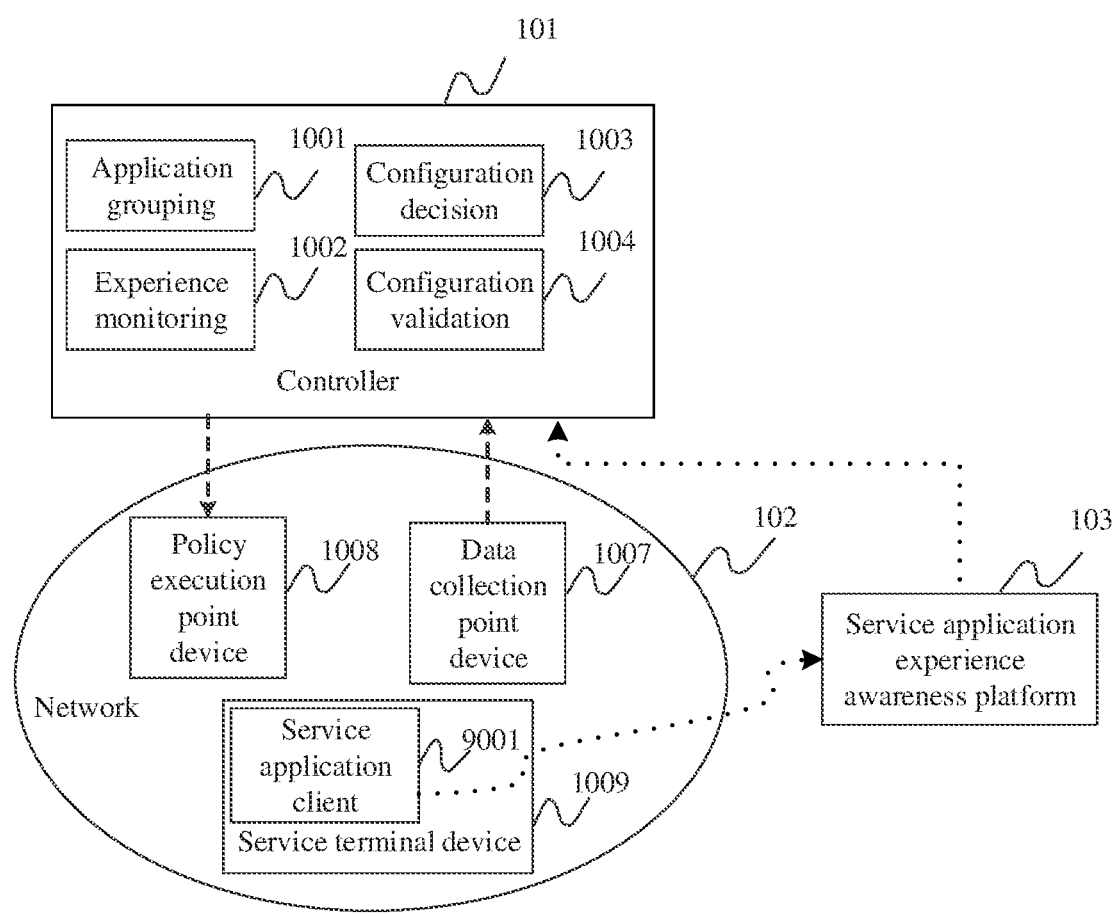
FIG. 2 is an architectural diagram of a method for guaranteeing service application experience according to an embodiment of this application.

FIG. 2 is an architectural diagram of a method for guaranteeing service application experience according to an embodiment of this application. The method includes the following content.

A controller 101 is responsible for grouping a plurality of service application types of a network into at least one application type group, monitoring link quality information of a plurality of links in the network and user experience information of the plurality of service application types, determining network configurations of the plurality of application type groups, determining execution effects of the network configurations according to real-time quality information of the plurality of links of the network and the user experience information of the plurality of service application types, and determining, based on the execution effects, whether experience of the service application is affected and whether the network configurations need to be updated, so as to ensure user experience of the plurality of service application types. The controller 101 includes an application grouping module 1001, an experience monitoring module 1002, a configuration decision module 1003, and a configuration validation module 1004. The application grouping module 1001 is mainly responsible for grouping a plurality of identified service application types into a plurality of application type groups based on a correspondence between the plurality of service application types and the plurality of application type groups. The experience monitoring module 1002 is mainly responsible for monitoring link quality statuses of the plurality of links in the network in real time or periodically and user experience statuses of the plurality of service application types. The configuration decision module 1003 is mainly responsible for making decisions on network configurations for data packet sending and experience guarantee of the plurality of application type groups. The configuration validation module 1004 is mainly responsible for delivering the decided network configurations to a policy execution point device 1008.

A network 102 for accessing the service application includes a data collection point device 1007, the policy execution point device 1008, and a service terminal device 1009. The collection point device 1007 is responsible for obtaining information related to service application type information and link quality information of a data packet in a link, and reporting the related information to the controller in real time or periodically. The data collection point device 1007 may be deployed in serial or in a bypass mode on a link through which a data packet is transmitted, and may collect and/or analyze the data packet based on its capability. The policy execution point device 1008 is responsible for executing the network configurations delivered by the controller 101 and forwarding data to a specified link. The service terminal device 1009 may access a service application through the network, and supports installation of service application client software, such as service application client software 9001 shown in FIG. 2.

A service application experience awareness platform 103 may monitor user experience effects of one or more service application types, and may synchronize a user experience indicator of the service application type to a third-party server or a third-party system in an active sending or subscription manner by using an API open interface. The user experience indicator of the service application type refers to a value or a value range of one or more indicators that can measure experience of the service application type from a perspective of user perception. For example, a MOS value (Mean Opinion Score) for a service application type of an audio type and a VMOS (Video Mean Opinion Score) for a service application type of a video type. The user experience indicator of the service application type may be calculated by using a client of the service application, or may be calculated by the service application experience awareness platform by using data fed back by a service application client. For example, the service application client 9001 is installed on the service terminal 1009, and the service application client 9001 may report a user experience indicator of a service application in the service application of the service terminal 1009 to the service application A experience awareness platform 103. The service application experience awareness platform 103 may synchronize the user experience indicator of the service application to the controller 101 by using the API open interface. The service application experience awareness platform 103 is an optional component in the method in this application. In addition, components and operations that are not explicitly stated as mandatory in this embodiment may be optional in some cases.

Figure 3A:
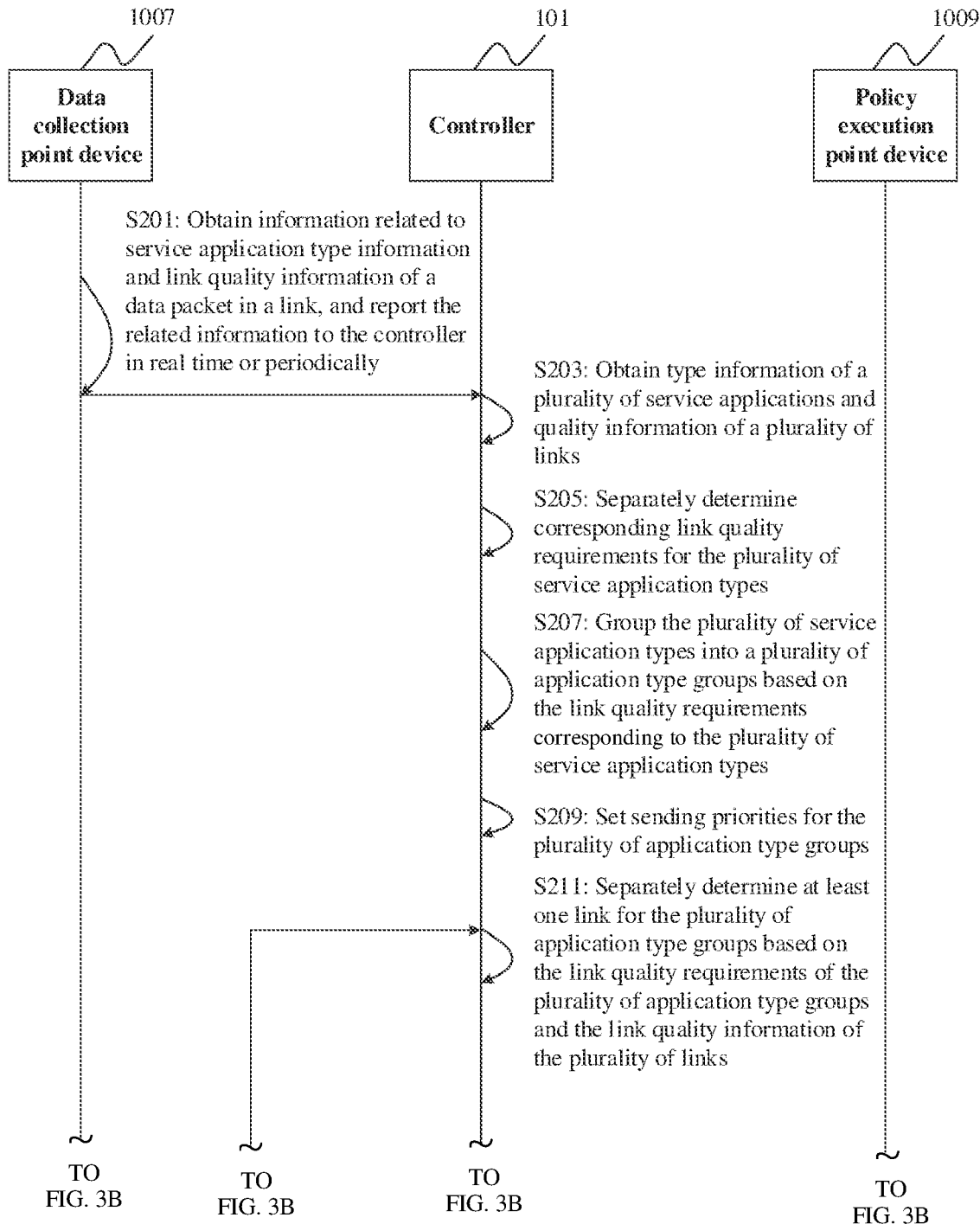
FIG. 3A and FIG. 3B are a flowchart of a method for guaranteeing service application experience according to an embodiment of this application.
Figure 3B:
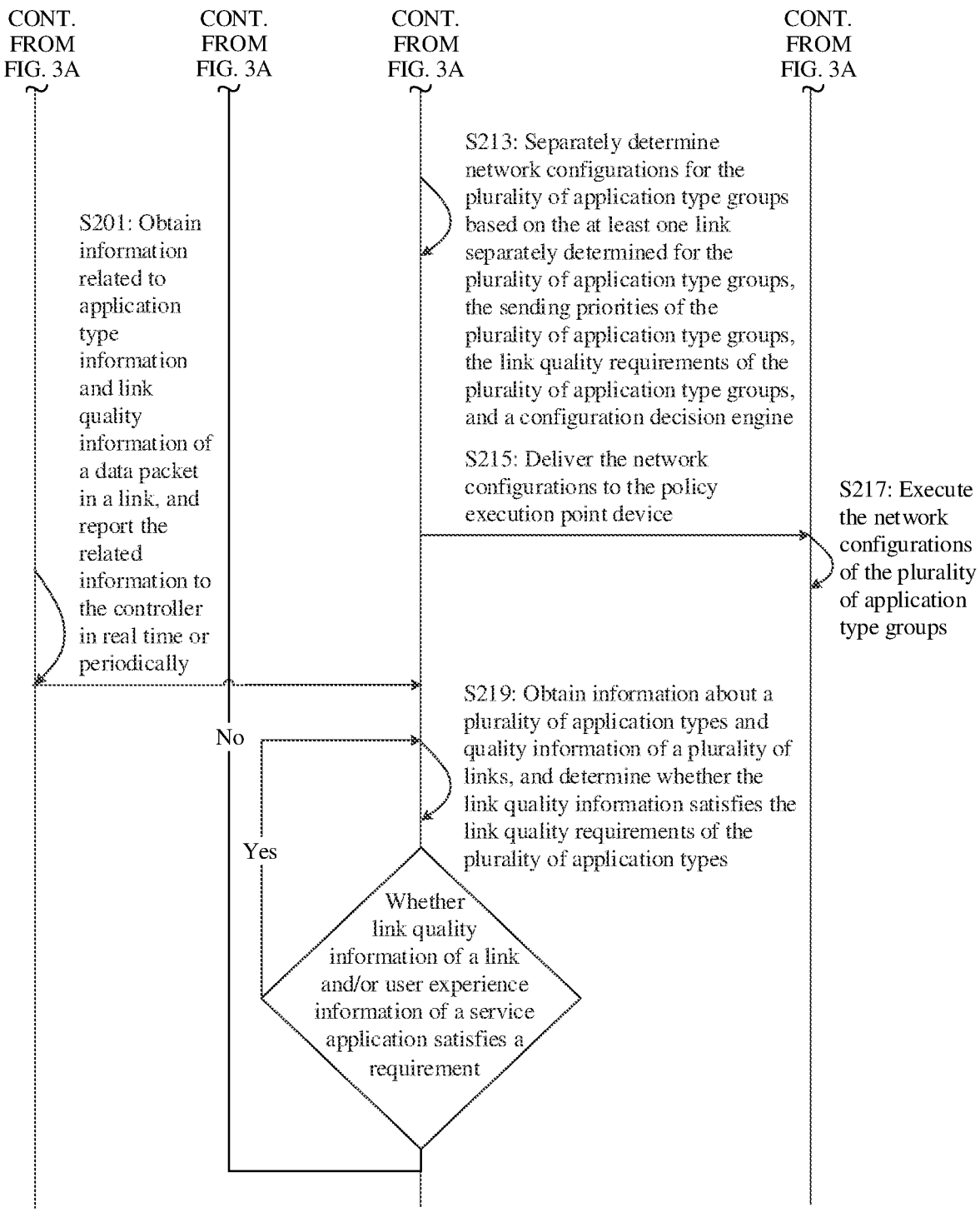

FIG. 3A and FIG. 3B are a flowchart of a method for guaranteeing service application experience according to an embodiment of this application. The specific method is as follows.

S201: A data collection point device obtains information related to service application type information and link quality information of a data packet in a link, and reports the related information to a controller in real time or periodically.

In some embodiments, the related information is the service application type information and the link quality information. The data collection point device 1007 has a capability of collecting data information of a data packet transmitted on a link, and may have a capability of analyzing and identifying service application type information (such as DPI, Deep Packet Inspection) by using data information of the data packet. The service application type is an application type to which a plurality of service applications belong. One service application type may include a plurality of specific service applications. For example, two service application types are identified in a network: A first service application type is an email box, and a second service application type is a customer relationship management application. The service application type of the email box may include three specific email applications: (1) an email box application A, (2) an email box application B, and (3) an email box application C. The customer relationship management application type may include two specific customer relationship management applications: (1) a customer relationship management application A and (2) a customer relationship management application B. The service application type information identified by the data collection point device 1007 may be identified by using an application AppID or application type real-name information. The data collection point device 1007 further has a capability of monitoring and analyzing the link quality information, for example, network quality analysis (NQA) and/or IP flow performance measurement (IPFPM). The link quality information includes: a packet loss rate, a jitter, a delay, or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. The comprehensive measurement indicator combines three basic indicators that indicate link quality: the delay, the jitter, and the packet loss rate, so as to measure the link quality more comprehensively. The data collection point device 1007 supports reporting of the service application type information and the link quality information to a controller 101 by using a physically reachable transmission link.

In some embodiments, the related information refers to data information of a data packet collected by the data collection point device. If the data collection point device 1007 does not have the capability of analyzing and identifying the service application type information by using the data information of the data packet, the collected data information of the data packet may be reported to the controller 101, and the controller 101 analyzes and identifies the service application type information of the service application. In some embodiments, if the data collection point device 1007 does not have the capability of monitoring and analyzing the link quality information, the data collection point device 1007 may report the data information of the collected data packet to the controller 101, and the controller 101 analyzes the link quality information. The data information of the data packet may include application layer protocol information in the data packet, a quantity of uplink traffic data packets in a fixed time period, and a quantity of downlink traffic data packets in a fixed time period.

If a service application data packet carries a user experience indicator, the collection point device 1007 directly parses and extracts the user experience indicator carried in the service application data packet, and reports the user experience indicator as user experience information to the controller 101. If the service application experience awareness platform 103 is deployed in an embodiment, the service application experience awareness platform 103 may obtain a user experience indicator of a service application, and synchronize the user experience indicator of the service application as user experience information to the controller 101 by using an API open interface.

S203: The controller obtains type information of a plurality of service applications and link quality information.

In some embodiments, the experience monitoring module 1002 of the controller 101 obtains the service application type information and the link quality information that are reported by the data collection point device 1007. The experience monitoring module 1002 obtains the service application type information and the link quality information, and may generate the service application list and a list of quality information of a plurality of links, and store the obtained information. The service application list and the list of quality information of a plurality of links belong to the generated corresponding information list. The information list may be classified into a real-time information list representing a moment and a historical information list representing a time period. The service application list includes: link information and service application type information identified on the link. The link information in the service application list includes a link name and a link type. The service application type information identified on the link includes: a sequence number, a meaning of the service application type name (AppID or application type real-name information), and the service application type name. For example, a service application list A includes information about a link A and service application type information identified on the link A. The information about the link A includes: link A-private line; and the service application type information identified on the link A: 1-AppID-778845, 2-real-name information-email, and 3-real-name information-customer relationship management application. The list of quality information of a plurality of links includes: a sequence number, a link name, a link type, a link quality information type, and a corresponding value. The link quality information type includes: a bandwidth, a packet loss rate, a jitter, a delay, or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. The comprehensive measurement indicator combines three basic indicators that indicate link quality: the delay, the jitter, and the packet loss rate, so as to measure the link quality more comprehensively. For example, the list B of quality information of a plurality of links include: 1-link A-private line-comprehensive measurement indicator-7900, 2-link B-private line-comprehensive measurement indicator-6500, and 3-link C-internet-comprehensive measurement indicator-5000.

In some embodiments, if the controller 101 further obtains user experience information of a plurality of service application types in the network, the experience monitoring module 1002 may obtain the user experience information, and generate a user experience information list of the plurality of service application types. The user experience information list of the service application types belongs to the generated corresponding information list. The user experience information list of the service application types includes: a sequence number, a meaning of the service application type name (AppID or application type real-name information), the service application type name, a name of a link where the service application is located, a meaning of user experience information of the service application (MOS or VMOS), and a value of the user experience information of the service application. For example, a user experience information list C of the service application includes: 1-AppID-778845-link A-MOS-5, 2-real-name information-high-definition video conference application-link B-VMOS-4.

In some embodiments, manners in which the experience monitoring module 1002 obtains type information of a plurality of service applications are as follows: 1. The collection point device 1007 directly identifies the type information (AppID or application type real-name information) of the plurality of service applications, reports the service application type information to the controller 101, and the experience monitoring module 1002 obtains the service application type information. 2. The collection point device 1007 does not support direct identification of the service application type information, the collection point device 1007 supports data information of a data packet of the service application, the collection point device 1007 reports the data information to the controller 101, and the controller 101 is responsible for identifying the type information of the service application by using the data information. The experience monitoring module 1002 obtains the type information of the service application.

In some embodiments, manners in which the experience monitoring module 1002 obtains link quality information of a link are as follows: 1. The collection point device 1007 directly calculates the link quality information of the link. For example, the collection point device 1007 has a calculation capability of a comprehensive measurement indicator, and reports the link quality information to the controller 101. An application grouping module 1001 may directly obtain the link quality information of the link. 2. The collection point device 1007 directly reports preliminarily processed data to the controller 101. For example, the collection point device 1007 collects only quantities of sent packets and received packets in a time period, and the experience monitoring module 1002 obtains the link quality information of the link based on the preliminarily processed data and a calculation formula.

In some embodiments, manners in which the experience monitoring module 1002 obtains user experience information of a plurality of service application types are as follows: 1. If the service application experience awareness platform 103 is deployed in the embodiment, the service application experience awareness platform 103 stores the user experience information of the service application type, and the controller 101 may synchronize the user experience information by using an API open interface provided by the service application experience awareness platform 103, and the experience monitoring module 1002 obtains the user experience information. 2. The collection point device 1007 supports direct acquisition of the user experience information of the service application type, the collection point device 1007 reports the user experience information to the controller 101, and the experience monitoring module 1002 obtains the user experience information. 3. The collection point device 1007 does not support direct acquisition of the user experience information of the service application type, the collection point device 1007 supports collection of a data packet of the service application type, where information of the data packet includes information related to the user experience information of the service application, the collection point device 1007 reports the related information to the controller 101, the controller 101 is responsible for obtaining through analysis the user experience information of the service application type by using the related information, and the experience monitoring module 1002 obtains the user experience information.

S205: The controller separately determines corresponding link quality requirements for the plurality of service application types.

The controller 101 separately determines corresponding link quality requirements for the plurality of service application types. The service application type refers to a type corresponding to a service application that is identified by the service application in the network through an application identification method (such as DPI, Deep Packet Inspection, deep packet inspection). One service application type may include a plurality of specific service applications. For example, two service application types are identified in a network: A first service application type is an email box, and a second service application type is a customer relationship management application. The service application type of the email box may include three specific email applications: (1) an email box application A, (2) an email box application B, and (3) an email box application C. The customer relationship management application type may include two specific customer relationship management applications: (1) a customer relationship management application A and (2) a customer relationship management application B. The plurality of service application types are application types to which the plurality of service applications belong. For example, the application type is a service application of an email, and the application type is a service application of a customer relationship management application. In S203, operation and maintenance personnel may view a plurality of service application types identified in a time period in the network, and learn of, based on the type information of the plurality of service applications, a plurality of service application types commonly used in the network. Operation and maintenance personnel need to determine the corresponding link quality requirements for the plurality of service application types.

The link quality requirements belong to a part of quality requirements of the service application types, and refer to quality requirements of data packets of the plurality of service application types for transmission links. The application grouping module 1001 may quantitatively measure the link quality requirement by using a measurement indicator of the link quality requirement. The measurement indicator of the link quality requirement refers to one or more values or one or more value ranges that can measure the quality requirement of the service application type for the link. The measurement indicator of the link quality requirement may include: a bandwidth, a packet loss rate, a jitter, a delay, and/or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. The comprehensive measurement indicator combines three basic indicators that indicate link quality: the delay, the jitter, and the packet loss rate, so as to measure the link quality more comprehensively.

In some embodiments, corresponding user experience requirements further need to be determined for the plurality of service application types. The user experience requirements of the service application types also belong to a part of the service application quality requirements, and refer to experience requirements of the plurality of service applications of the service application types that are described from a perspective of user perception. The application grouping module 1001 may quantitatively measure the user experience requirement by using a measurement indicator of the user experience requirement. The measurement indicator of the user experience requirement refers to one or more values or one or more value ranges of an indicator that can measure experience of the service type application from the perspective of user perception. For example, a MOS value (Mean Opinion Score) for an audio service application and a VMOS (Video Mean Opinion Score) for a video service application.

In S203, operation and maintenance personnel may view the service application list on the controller 101, and operation and maintenance personnel may learn of a plurality of service application types commonly used in the enterprise network in a time period. Operation and maintenance personnel may preset and/or customize, in the controller 101, some or all of measurement indicators of link quality requirements of the commonly used service application types. Based on the foregoing indicators, the controller 101 may learn of link quality requirements that the plurality of links in the network need to satisfy, so as to satisfy the link quality requirements of the plurality of service application types. Operation and maintenance personnel may determine, based on the plurality of service application types in the enterprise network, whether to use the user experience requirements as the quality requirements of the service applications. In some embodiments, if the enterprise network has a service application type that has a user experience guarantee requirement, operation and maintenance personnel may preset and/or customize, in the controller 101, use of some or all of measurement indicators of a user experience requirement of the service application type. In some embodiments, if there is no service application type that has a user experience guarantee requirement in the enterprise network, operation and maintenance personnel do not need to set a measurement indicator of the user experience requirement in the controller 101. By using the foregoing indicators, the controller 101 learns of the user experience requirements that need to be satisfied by the plurality of service application types.

For example, operation and maintenance personnel need to set, in the controller 101, a bandwidth and a comprehensive measurement indicator as measurement indicators of the link quality requirement, and set a MOS value and a VMOS value as measurement indicators of the user experience requirement only for an audio and video service application. In this case, operation and maintenance personnel need to input bandwidths and empirical values of the comprehensive measurement indicator that are required by the plurality of service applications into the controller 101. Operation and maintenance personnel further need to input empirical values of the MOS and the VMOS of the audio and video service application into the controller 101.

For example, for a high-definition video conference service application type, a link quality requirement of the high-definition video conference service application type is as follows: A bandwidth is greater than 15 Mbps; a delay indicator range is [0, 80], and a unit is millisecond; a packet loss rate indicator range is [0, 1], and a unit is ‰; and a jitter indicator range is [0, 50], and a unit is millisecond. Based on the calculation formula for the comprehensive measurement indicator, a value range of a calculation result is [8819, 9000]. Finally, measurement indicators of the link quality requirement of the high-definition video conference service application type are obtained as follows: The bandwidth indicator range is [15, 20], and a unit is Mbps; and a comprehensive measurement indicator needs to be greater than 8819. Measurement indicators of a user experience requirement of the high-definition video conference service application type are as follows: A MOS value is greater than 4, and a VMOS value is greater than 4.

For example, for a web browsing service application type, a link quality requirement of the web browsing service application type is as follows: A bandwidth greater than 0.3 Mbps; a one-way delay indicator range of each web page is [0, 4000], and a unit is millisecond; a packet loss rate indicator range is [0, 20], and a unit is ‰; and a jitter indicator of a non-real-time service application may be a fixed value, for example, 3000, and a unit is millisecond. Based on the calculation formula for the comprehensive measurement indicator, a value range of a calculation result is [3980, 9000]. Finally, measurement indicators of the link quality requirement of the web browsing service application type are obtained as follows: The bandwidth indicator range is [0.3, 1], and a unit is Mbps; and a comprehensive measurement indicator needs to be greater than 3980. Based on enterprise characteristics, operation and maintenance personnel consider that the web browsing service application type is not a service application type for enterprise network user experience guarantee. Therefore, operation and maintenance personnel do not set use of a measurement indicator of a user experience requirement.

For example, operation and maintenance personnel may further set, in the controller 101, three indicators: a bandwidth, a delay, and a packet loss rate, as measurement indicators of the link quality requirement, and do not set a measurement indicator of the user experience requirement. The application grouping module 1001 may be set to use three indicators: a bandwidth, a delay, and a packet loss rate, as measurement indicators of the link quality requirement. Operation and maintenance personnel may use ranges of the bandwidth, the delay, and the packet loss rate that are acceptable to a plurality of service application types as measurement indicators of the link quality requirements of the service applications. For example, measurement indicators of the link quality requirement of the high-definition video conference service are as follows: A bandwidth indicator range is [15, 20], and a unit is Mbps; a delay indicator range is [0, 80], and a unit is millisecond; and a packet loss rate indicator range is [0,1], and a unit is ‰. Measurement indicators of the link quality requirement of the web browsing service are as follows: A bandwidth indicator range is [0.3, 1], and a unit is Mbps; a one-way delay indicator range of each web page is [0, 4000], and a unit is millisecond; and a packet loss rate indicator range is [0, 20], and a unit is ‰.

Operation and maintenance personnel may identify a service application type commonly used by the enterprise. For example, operation and maintenance personnel may view a service application list on the controller 101 by using S203, and operation and maintenance personnel may learn of a service application type commonly used in the enterprise network in a time period. Then, the measurement indicator of the link quality requirement and/or the measurement indicator of the user experience requirement of the service application type may be obtained according to the foregoing method. The controller 101 may store measurement indicators of link quality requirements and measurement indicators of user experience requirements of a plurality of service application types. The application grouping module 1001 obtains the measurement indicators of the link quality requirements and the measurement indicators of the user experience requirements of the plurality of service application types.

S207: The controller groups the plurality of service application types into a plurality of application type groups based on the link quality requirements corresponding to the plurality of service application types.

Operation and maintenance personnel may group a plurality of service application types commonly used by the enterprise based on link quality, and group the plurality of application types into a plurality of application type groups. The plurality of application type groups are obtained by grouping the plurality of service application types according to a rule, and grouping service application types with a same feature into one application type group, so that the plurality of service application types can form the plurality of application type groups. For example, based on characteristics of services of the enterprise network, operation and maintenance personnel group service application types of the enterprise into three application type groups based on link quality requirements, which are respectively: 1. an experience guarantee type group, where a service application type in the application type group needs to be provided with a bandwidth guarantee and an extremely low delay and packet loss rate; 2. a function guarantee type group, where a service application type in the application type group needs to be provided with a bandwidth guarantee and a relatively low delay and packet loss rate; 3. a data transmission type group, where a service application type in the application type group needs to be provided with a bandwidth guarantee and a general delay and packet loss rate. It can be learned that a quantity of the service application type groups is less than a quantity of service application types. A function of the service application type group is to group service applications of a plurality of service application types according to a specific rule, and group service application types having a same feature into one application type group, so that the plurality of service application types can form a plurality of application type groups. In this way, operation and maintenance personnel can perform network configuration for data sending and experience guarantee of a service application based on an application type group of the service application, thereby improving network configuration efficiency.

Operation and maintenance personnel may further identify a typical service application type in each service application type group, and set a correspondence between the service application type group and the service application type on the controller 101. In this way, a measurement indicator of a link quality requirement of the typical service application type may be used as a measurement indicator of a link quality requirement of the service application type group. In some embodiments, a measurement indicator of a user experience requirement of the typical service application type may be used as a measurement indicator of a user experience requirement of the service application type group. In this way, the application grouping module 1001 obtains a correspondence between the application type group and the measurement indicator of the link quality requirement and/or the measurement indicator of the user experience requirement of the application type group.

For example, based on the characteristics of the services of the enterprise, operation and maintenance personnel generally group a plurality of service application types of the enterprise into three service application type groups based on link quality requirements, which are respectively: 1. an experience guarantee type group, where a service application type in the application type group needs to be provided with a bandwidth guarantee and an extremely low delay and packet loss rate, the delay is less than 80 ms, and the packet loss rate is less than 1‰; 2. a function guarantee type group, where a service application type in the application type group needs to be provided with a bandwidth guarantee and a relatively low delay and packet loss rate, the delay is less than 400 milliseconds, and the packet loss rate is less than 20‰; 3. a data transmission type group, where a service application type in the application type group needs to be provided with a bandwidth guarantee and a general delay and packet loss rate, the delay is less than 800 milliseconds, and the packet loss rate is less than 100‰. A high-definition video conference service application type is selected from the experience guarantee type group as a typical service application type. A web browsing service application type is selected from the function guarantee type group as a typical service application type. An enterprise internal file transfer service is selected from the enterprise data transmission type group as a typical service application type. Operation and maintenance personnel use a comprehensive measurement indicator instead of a measurement indicator of a user experience requirement as the measurement indicator of the link quality requirement of the service application. Operation and maintenance personnel need to obtain measurement indicators of link quality requirements of the high-definition video conference service application type, the web browsing service application type, and the enterprise internal file transfer service application type. The indicators are respectively used as measurement indicators of link quality requirements of three application type groups, namely, the enterprise experience guarantee type group, the function guarantee type group, and the enterprise data transmission type group. A calculated range of the measurement indicator of the link quality requirement of the high-definition video conference service application type is [8820, 9000], a calculated range of the measurement indicator of the link quality requirement of the web browsing service application type is [8580, 9000], and a calculated range of the measurement indicator of the link quality requirement of the enterprise internal file transfer service application type is [8100, 9000]. Therefore, a correspondence between the three service application type groups of the enterprise and the measurement indicators of the link quality requirements of the three service application type groups is as follows: A measurement indicator range of the link quality requirement corresponding to the experience guarantee type group is [8820, 9000], a measurement indicator range of the link quality requirement corresponding to the function guarantee type group is [8580, 9000], and a measurement indicator range of the link quality requirement corresponding to the data transmission type group is [8100, 9000]. The application grouping module 1001 obtains measurement indicators of link quality requirements of a plurality of service application types, and further obtains a correspondence between the application type groups and the measurement indicators of the link quality requirements of the application type groups. Therefore, the plurality of service application types may be grouped into a plurality of application type groups.

In some embodiments, the application grouping module 1001 obtains measurement indicators of link quality requirements of a plurality of service application types, and based on a correspondence between service application type groups and measurement indicators of link quality requirements of the application type groups, compares the measurement indicators of the link quality requirements of the plurality of service application types with the correspondence. The application grouping module 1001 may obtain application type groups of the plurality of service application types, that is, grouping results of the service application types. In some embodiments, operation and maintenance personnel may set, based on a plurality of service application types in the enterprise network, measurement indicators of user experience requirements as quality indicators for grouping the plurality of service application types. For example, the enterprise has a plurality of service application types of audio and video types, and the service application types are defined by operation and maintenance personnel as key service application types that require user experience and feeling guarantee. In a process of grouping the service application types, operation and maintenance personnel may use measurement indicators of user experience requirements as quality indicators for grouping the service application types.

For example, the application grouping module 1001 may be set to use a comprehensive measurement indicator as a measurement indicator of the link quality requirement, and is not set to use a measurement indicator of the user experience requirement. The experience monitoring module 1002 obtains service application type information and link quality information, and generates a service application list. By using the service application list, the application grouping module 1001 obtains a service application type, where the service application type is a video conference application type. The application grouping module 1001 is set with a measurement indicator range of a link quality requirement of the video conference application type as [8860, 9000]. A correspondence between the three service application type groups of the enterprise and the measurement indicators of the link quality requirements of the three service application type groups is as follows: A measurement indicator range of the link quality requirement corresponding to the experience guarantee type group is [8820, 9000], a measurement indicator range of the link quality requirement corresponding to the function guarantee type group is [8580, 9000], and a measurement indicator range of the link quality requirement corresponding to the enterprise data transmission type group is [8100, 9000]. It can be learned that the measurement indicator range of the link quality requirement of the foregoing service application type is within the measurement indicator range of the link quality requirement corresponding to the experience guarantee type group. Therefore, the foregoing service application type should be grouped into the experience guarantee type group. In this case, the application grouping module 1001 may group the service application type into the experience guarantee type group.

For example, the application grouping module 1001 may be set to use two indicators: the delay and the packet loss rate, as measurement indicators of the link quality requirement, and is not set to use the measurement indicator of the user experience requirement. The experience monitoring module 1002 obtains application type information and link quality information, and generates a service application list. By using the service application list, the application grouping module 1001 obtains a service application type, where the service application type is a CRM conference application type. The application grouping module 1001 is set with measurement indicators of a link quality requirement of the CRM application type as follows: A delay indicator range is [0, 500], and a unit is millisecond; and a packet loss rate indicator range is [0, 10], and a unit is ‰. A correspondence between the three application type groups of the enterprise and the measurement indicators of the link quality requirements of the three application type groups is as follows: 1. Measurement indicators of the link quality requirement corresponding to the experience guarantee type group are as follows: A delay indicator range is [0,80], and a unit is millisecond; and a packet loss rate indicator range is [0, 1], and a unit is ‰. 2. Measurement indicators of the link quality requirement corresponding to the function guarantee type group are as follows: A delay indicator range is [0, 400], and a unit is millisecond; and a packet loss rate indicator range is [0, 20], and a unit is ‰. 3. Measurement indicators of the link quality requirement corresponding to the data transmission type group are as follows: A delay indicator range is [0, 800], and a unit is millisecond; and a packet loss rate indicator range is [0, 100], and a unit is ‰. It can be known that the measurement indicator range of the link quality requirement of the CRM application type is within the measurement indicator range of the link quality requirement of the application type group, that is, the function guarantee type group. Therefore, the foregoing service application type should be grouped into the function guarantee type group, and the application grouping module 1001 may group the service type into the function guarantee type group.

S209: The controller sets sending priorities for the plurality of application type groups.

Operation and maintenance personnel may preset or customize a correspondence between the plurality of application type groups and the sending priorities in the controller 101. Because the application grouping module 1001 groups the plurality of service application types into the plurality of application type groups, the sending priorities of the application type groups may be determined based on the correspondence between the plurality of application type groups and the sending priorities, which are actually the sending priorities of the service application types. For example, a sending priority of the experience guarantee type group is high, a sending priority of the function guarantee type group is medium, and a sending priority of the data transmission type group is low. According to a support degree of the policy execution point device 1008 for a data processing priority, operation and maintenance personnel may further preset or customize, in the controller 101, a priority queue for sending service application data, for example, three priority queue levels: high, medium, and low. For example, if the sending priority of the experience guarantee type group is high, a data packet of a service application type in the experience guarantee type group enters a high-priority queue; or if the sending priority of the function guarantee type group is high, a data packet of a service application type in the function guarantee type group enters a high-priority queue.

S211: The controller separately determines at least one link for the plurality of application type groups based on the link quality requirements of the plurality of application type groups and link quality information of a plurality of links.

The experience monitoring module 1002 obtains application type information and link quality information, and may generate the service application list and the list of quality information of a plurality of links. The list of quality information of a plurality of links includes: a sequence number, a link name, a link type, a link quality information type, and a corresponding value. The link quality information type includes: a bandwidth, a packet loss rate, a jitter, a delay, or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. The link quality may be measured more comprehensively by using the comprehensive measurement indicator.

It should be noted that, the experience monitoring module 1002 and the application grouping module 1001 need to use link quality and measurement indicators of link quality requirements of service application types that are defined and calculated in a same manner. For example, if the experience monitoring module 1002 is set to use a comprehensive measurement indicator as the link quality information for measuring the link quality, the application grouping module 1001 also needs to use a comprehensive measurement indicator as a measurement indicator of the link quality requirement of the service application type, and calculation formulas of the comprehensive measurement indicators need to be completely the same.

In some embodiments, the experience monitoring module 1002 is set to use a comprehensive measurement indicator as link quality information of the link. The experience monitoring module 1002 obtains link quality information of a link A. The link quality information is specifically as follows: The comprehensive measurement indicator is 8860. The experience monitoring module 1002 obtains, from the controller 101, a correspondence between a plurality of application type groups and measurement indicators of link quality requirements. For example, as specified by the enterprise, a measurement indicator range of a link quality requirement corresponding to the experience guarantee type group is [8820, 9000], a measurement indicator range of a link quality requirement corresponding to the function guarantee type group is [8580, 9000], and a measurement indicator range of a link quality requirement corresponding to the data transmission type group is [8100, 9000]. The experience monitoring module 1002 compares a comprehensive measurement indicator in the link quality information of the link A with the measurement indicators of the link quality requirements of the plurality of application type groups. Because the comprehensive measurement indicator of the link A is 8860, the link A satisfies the link quality requirements of the experience guarantee type group, the function guarantee type group, and the data transmission type group.

In some embodiments, the experience monitoring module 1002 is set to use indicators delay and packet loss rate in the link quality information as measurement indicators of the link quality. The experience monitoring module 1002 obtains the link quality information of the link A. The link quality information of the link A is: a delay of 50 milliseconds, and a packet loss rate of 60‰. The experience monitoring module 1002 obtains, from the controller 101, a correspondence between a plurality of application type groups and measurement indicators of link quality requirements. For example, the measurement indicator range of the link quality requirement of the experience guarantee type group specified by the enterprise is as follows: A delay indicator is [0, 80], and a unit is millisecond; and a packet loss rate indicator range is [0, 1], and a unit is ‰. Measurement indicators of the link quality requirement of the function guarantee type group are as follows: A delay indicator range is [0, 400], and a unit is millisecond; and a packet loss rate indicator range is [0, 20], and a unit is ‰. Measurement indicators of the link quality requirement of the data transmission type group are as follows: A delay indicator range is [0, 800], and a unit is millisecond; and a packet loss rate indicator range is [0, 100], and a unit is ‰. The experience monitoring module 1002 compares the indicators delay and packet loss rate in the link quality information of the link A with the measurement indicators of the link quality requirements of the plurality of application type groups. Because the indicators delay and packet loss rate of the link A are 50 and 60 respectively, the link A does not satisfy the link quality requirements of the experience guarantee type group, the function guarantee type group, and the data transmission type group, and may be marked as not satisfied. In some embodiments, for a link marked as not satisfied, the not satisfied mark of the link may be further marked based on a degree of proximity between a measurement indicator of link quality information of the link and a measurement indicator of a link quality requirement of an application type group. For example, according to a formula: a ratio of an absolute value of a difference between the indicator of the link quality information of the link and the measurement indicator of the link quality requirement of the application type group to the measurement indicator of the link quality requirement of the application type group. For example, if the ratio is less than 0.1, it may be marked as not satisfied—extremely close; if the ratio is greater than or equal to 0.1 and less than 0.5, it may be marked as not satisfied—relatively close; and if the ratio is greater than or equal to 0.5, it may be marked as not satisfied—not close. By further marking the not satisfied mark of the link, link selection may be performed when there are no sufficient links that satisfy the measurement indicator of the link quality requirement of the application type group.

According to the foregoing method, the experience monitoring module 1002 may mark a satisfaction degree of each link based on link quality information of the link and the measurement indicator of the link quality requirement of the application type group, and the controller 101 may determine a satisfaction degree of each link for the link quality requirement of the application type group based on the mark.

S213: The controller separately determines network configurations for the plurality of application type groups based on the at least one link separately determined for the plurality of application type groups, the sending priorities of the plurality of application type groups, the link quality requirements of the plurality of application type groups, and a configuration decision engine.

According to the foregoing method, for the service applications of the plurality of application type groups, the controller 101 has separately determined the at least one link for the plurality of application type groups, the sending priorities of the plurality of application type groups, and the link quality requirements of the plurality of application type groups. The configuration decision module 1003 may obtain the foregoing information and use the foregoing information as an input condition. The configuration decision module 1003 has a configuration decision engine, and a function of the configuration decision engine is to output one or more network configurations for the plurality of application type groups based on the foregoing information and through calculation of the engine. The network configuration includes: link information selected for data packet sending of the service application, a sending priority set for the data packet, a bandwidth configuration of the link, a QoS configuration, and/or a traffic shaping configuration of the link. The link information includes: a physical port corresponding to the link, and a logical port, that is, an IP address corresponding to the port. In some embodiments, the configuration decision engine is a computing engine designed based on a greedy algorithm. The greedy algorithm is also referred to as a greedy algorithm, and is a common method for finding an optimal solution problem. The method pattern generally divides a solving process into several steps, and each step applies a greedy algorithm principle, that is, selects optimal selection in a current state or local most advantageous selection, thereby hoping that a finally derived result is also an optimal solution. For example, the configuration decision module 1003 needs to determine the network configurations for the plurality of service applications of the plurality of service application groups. The configuration decision module 1003 uses the at least one link separately determined for the plurality of application type groups, the sending priorities of the plurality of application type groups, and measurement indicators of the link quality requirements of the plurality of application type groups as greedy conditions, and finally obtains a global recommended network configuration in a manner of obtaining a local optimal policy in each step. The greedy conditions may further include measurement indicators of user experience requirements of the plurality of application type groups and a cost requirement of the link. In some embodiments, the configuration decision module 1003 separately determines the network configurations for the plurality of application type groups based on the at least one link separately determined for the plurality of application type groups, the sending priorities of the plurality of application type groups, the link quality requirements of the plurality of application type groups, the user experience requirements of the plurality of application type groups, cost requirements of the plurality of links, and a policy recommendation engine.

S215: The controller delivers the network configurations to a policy execution point device.

The configuration validation module 1004 delivers the network configurations decided in S213 to the policy execution point device 1008.

S217: The policy execution point device executes the network configurations of the plurality of application type groups.

The policy execution point device 1008 receives and executes the network configurations of the plurality of application type groups.

S219: The controller obtains information about a plurality of service application types and quality information of a plurality of links, and determines whether the link quality information satisfies the link quality requirements of the plurality of application types; and if the link quality information satisfies the link quality requirements of the plurality of application types, the policy execution point device continues to perform existing network configurations; or if the link quality information does not satisfy the link quality requirements of the plurality of application types, returns to perform S211 to S217, and separately re-determines and executes network configurations for the plurality of application type groups.

According to the description in S201, the data collection point device 1007 obtains information related to the service application type information and the link quality information of the data packet in the link, and reports the related information to the controller 101 in real time or periodically. After S217 is performed, the data collection point device 1007 reports the related information to the controller 101 in real time or periodically. Therefore, the controller 101 may monitor link quality information of each link in real time or periodically by using the related information, and determine, by comparing the link quality information with a measurement indicator of a link quality requirement corresponding to the application type group, whether the link quality information satisfies the link quality requirements of the plurality of application types. If the link quality information satisfies the link quality requirements of the plurality of application types, the policy execution point device continues to perform existing network configurations; and if the link quality information does not satisfy the link quality requirements of the plurality of application types, returns to perform S211, and needs to separately re-determine at least one link for the plurality of application type groups. Then, S215 to S217 are performed to re-determine network configurations for the plurality of application type groups based on the at least one link separately re-determined for the plurality of application type groups, the sending priorities of the plurality of application type groups, the link quality requirements of the plurality of application type groups, and the decision recommendation engine.

In some embodiments, if the data collection point device 1007 is capable of reporting user experience information of a service application or the service application experience awareness platform 103 is deployed in the method in the embodiment, the controller 101 may obtain user experience information of the plurality of service applications of the plurality of application type groups in real time or periodically. The experience monitoring module 1002 obtains the link quality information and the user experience information of the service application in real time or periodically. The experience monitoring module 1002 compares obtained link quality information of a link with a measurement indicator of a link quality requirement of an application type group to which a data packet sent by the link belongs, so as to determine whether the link quality information and user experience information satisfy the link quality requirements and the user experience requirements of the plurality of application types. If the link quality information and the user experience information satisfy the link quality requirements and the user experience requirements of the plurality of application types, the policy execution point device continues to perform the existing network configurations; and if the link quality information and/or the user experience does not satisfy the link quality requirements and/or the user experience requirements of the plurality of application types, returns to perform S211, and needs to separately re-determine at least one link for the plurality of application type groups. Then, S215 to S217 are performed to re-determine network configurations for the plurality of application type groups based on the at least one link separately re-determined for the plurality of application type groups, the sending priorities of the plurality of application type groups, the link quality requirements of the plurality of application type groups, and the decision recommendation engine. In some embodiments, the configuration decision module 1003 may further separately determine new network configurations for the plurality of application type groups based on the at least one link separately determined for the plurality of application type groups, the sending priorities of the plurality of application type groups, the link quality requirements of the plurality of application type groups, the user experience requirements of the plurality of application type groups, cost requirements of the plurality of links, and the configuration decision engine.

For example, the experience monitoring module 1002 finds, through indicator comparison, that a link quality requirement of a marked service application type group A cannot be satisfied due to quality deterioration of the link A, which indicates that a sending link and/or a configuration parameter in an original network configuration cannot ensure the link quality requirement of the service application type group A, and the experience monitoring module 1002 notifies the configuration decision module 1003 to re-decide a network configuration for the service application type group A. The configuration validation module 1004 delivers the new network configurations to the policy execution point device 1008, and the policy execution point device 1008 executes the new network configurations.

For example, if obtaining user experience information of a plurality of service applications in real time or periodically, the experience monitoring module 1002 compares the user experience information with user experience requirements of a plurality of application type groups to which the plurality of service applications belong, and determines whether the link quality information and the user experience information satisfy link quality requirements and user experience requirements of the plurality of application types through comparison. The experience monitoring module 1002 finds, through indicator comparison, that user experience information of a service application type group B cannot satisfy a user experience requirement, which indicates that a sending link and/or a configuration parameter in an original network configuration cannot ensure user experience of the service application type group B. The experience monitoring module 1002 notifies the configuration decision module 1003 to re-determine a new network configuration. The configuration validation module 1004 delivers the new network configuration, and the policy execution point device 1008 executes the new network configuration.

Figure 4:
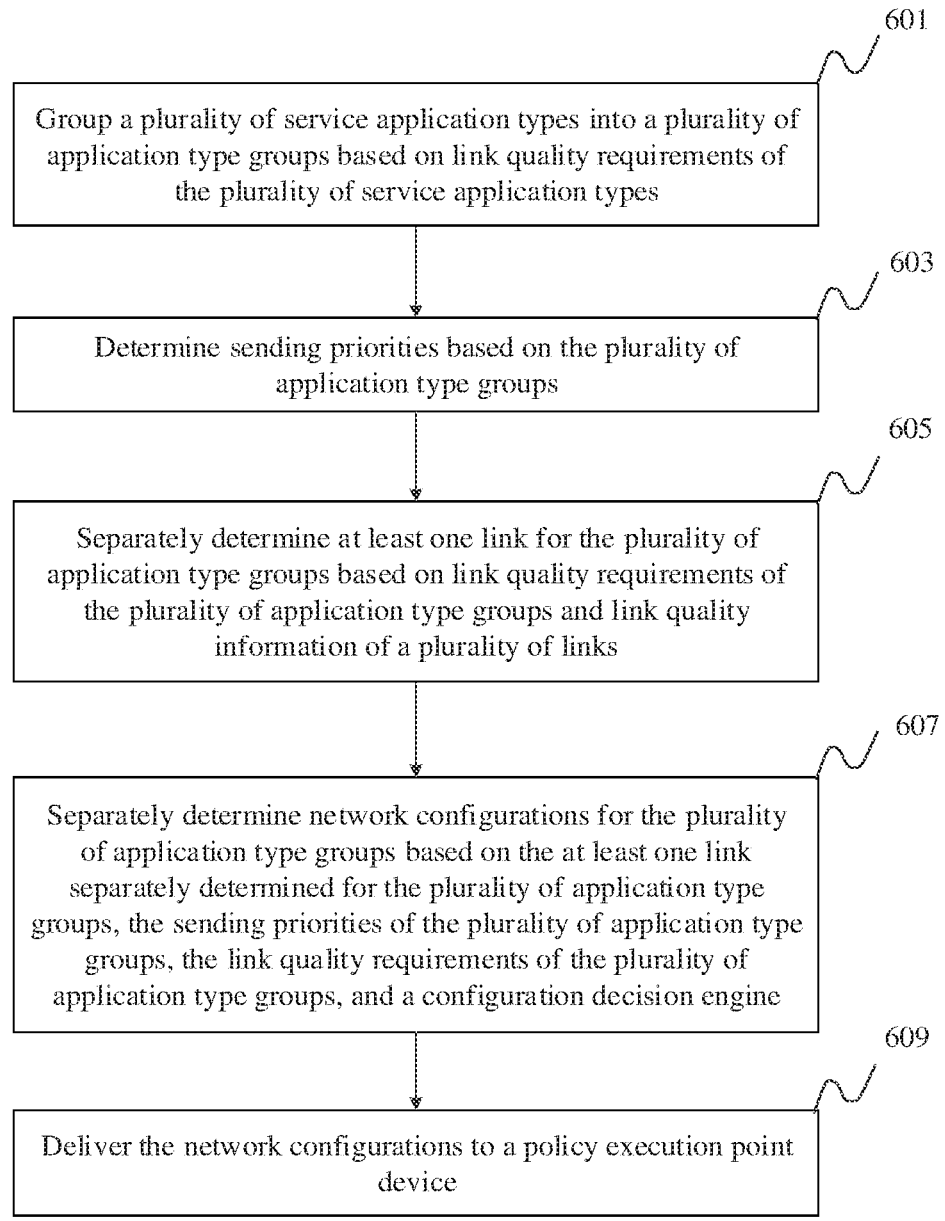
FIG. 4 is a flowchart of a method for guaranteeing service application experience according to an embodiment of this application.

FIG. 4 is a flowchart of a method for guaranteeing service application experience according to an embodiment of this application. The specific method is as follows:

S601: Group a plurality of service application types into a plurality of application type groups based on link quality requirements of the plurality of service application types.

A controller 101 groups the plurality of service application types into the plurality of application type groups based on the link quality requirements of the plurality of service application types. The service application type refers to a type corresponding to a service application that is identified by a service application in a network by using a service application identification technology, for example, a DPI technology (DPI, Deep Packet Inspection). One service application type may include a plurality of specific service applications. For example, two service application types are identified in a network: A first service application type is an email box, and a second service application type is a customer relationship management application. The service application type of the email box may include three specific email applications: (1) an email box application A, (2) an email box application B, and (3) an email box application C. The customer relationship management application type may include two specific customer relationship management applications: (1) a customer relationship management application A and (2) a customer relationship management application B.

Operation and maintenance personnel may determine link quality requirements of a plurality of service application types that are commonly used in the network. The link quality requirements belong to a part of quality requirements of the service application types, and refer to quality requirements of data packets of the plurality of service application types for transmission links. The application grouping module 1001 shown in FIG. 2 may quantitatively measure the link quality requirement by using a measurement indicator of the link quality requirement. The measurement indicator of the link quality requirement refers to one or more values or one or more value ranges that can measure the quality requirement of the service application type for the link. The measurement indicator of the link quality requirement may include: a bandwidth, a packet loss rate, a jitter, a delay, and/or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. It can be learned from the calculation formula of the comprehensive measurement indicator that the comprehensive measurement indicator combines three basic indicators that indicate link quality: the delay, the jitter, and the packet loss rate, so as to measure the link quality more comprehensively. A larger value of the comprehensive measurement indicator indicates better link quality. Operation and maintenance personnel may preset and/or customize, in the controller 101, some or all of measurement indicators of link quality requirements of the commonly used service application types. Based on the foregoing indicators, the controller 101 may learn of link quality requirements that the plurality of links in the network need to satisfy, so as to satisfy the link quality requirements of the plurality of service application types.

Operation and maintenance personnel may group a plurality of service application types commonly used by the enterprise based on link quality, and group the plurality of application types into a plurality of application type groups. The plurality of application type groups are obtained by grouping the plurality of service application types according to a rule, and grouping service application types with a same feature into one application type group, so that the plurality of service application types can form the plurality of application type groups. For example, based on characteristics of services of the enterprise, operation and maintenance personnel group service application types of the enterprise into three application type groups based on link quality requirements, which are respectively: 1. an experience guarantee type group, where a service application type in the application type group needs to be provided with a bandwidth guarantee and an extremely low delay and packet loss rate; 2. a function guarantee type group, where a service application type in the application type group needs to be provided with a bandwidth guarantee and a relatively low delay and packet loss rate; 3. a data transmission type group, where a service application type in the application type group needs to be provided with a bandwidth guarantee and a general delay and packet loss rate. It can be learned that a quantity of the service application type groups is less than a quantity of service application types. A function of the service application type group is to group service applications of a plurality of service application types according to a specific rule, and group service application types having a same feature into one application type group, so that the plurality of service application types can form a plurality of application type groups. In this way, operation and maintenance personnel can perform network configuration for data sending and experience guarantee of a service application based on an application type group of the service application, thereby improving network configuration efficiency.

Operation and maintenance personnel may further identify a typical service application type in each service application type group, and set a correspondence between the service application type group and the typical service application type on the controller 101. If the typical service application type changes because of a change of an enterprise service type or a change of service application deployment, operation and maintenance personnel may make a corresponding change on the controller 101, and set a correspondence between a latest service application type group and the typical service application type. In this way, a measurement indicator of a link quality requirement of the typical service application type may be used as a measurement indicator of a link quality requirement of the service application type group. In some embodiments, a measurement indicator of a user experience requirement of the typical service application type may be used as a measurement indicator of a user experience requirement of the service application type group. In this way, the application grouping module 1001 obtains a correspondence between the application type group and the measurement indicator of the link quality requirement of the user experience requirement of the application type group.

In some embodiments, the application grouping module 1001 obtains measurement indicators of link quality requirements of a plurality of service application types, and based on a correspondence between service application type groups and measurement indicators of link quality requirements of the application type groups, compares the measurement indicators of the link quality requirements of the plurality of service application types with the correspondence. The application grouping module 1001 may obtain application type groups of the plurality of service application types, that is, grouping results of the service application types. In some embodiments, operation and maintenance personnel may set, based on a plurality of service application types in the enterprise network, measurement indicators of user experience requirements as quality indicators for grouping the plurality of service application types.

For example, the application grouping module 1001 may be set to use a comprehensive measurement indicator as a measurement indicator of the link quality requirement, and is not set to use a measurement indicator of the user experience requirement. The experience monitoring module 1002 obtains service application type information and link quality information, and generates a service application list. By using the service application list, the application grouping module 1001 obtains a service application type, where the service application type is a high-definition video conference application type. The application grouping module 1001 is set with a measurement indicator range of a link quality requirement of the high-definition video conference application type as [8860, 9000]. A correspondence between the three service application type groups of the enterprise and the measurement indicators of the link quality requirements of the three service application type groups is as follows: A measurement indicator range of the link quality requirement corresponding to the experience guarantee type group is [8820, 9000], a measurement indicator range of the link quality requirement corresponding to the function guarantee type group is [8580, 9000], and a measurement indicator range of the link quality requirement corresponding to the data transmission type group is [8100, 9000]. It can be learned that the measurement indicator range of the link quality requirement of the foregoing service application type is within the measurement indicator range of the link quality requirement corresponding to the experience guarantee type group. Therefore, the foregoing service application type should be grouped into the experience guarantee type group. In this case, the application grouping module 1001 may group the service application type into the experience guarantee type group.

For example, the application grouping module 1001 may be set to use two indicators: the delay and the packet loss rate, as measurement indicators of the link quality requirement, and is not set to use the measurement indicator of the user experience requirement. The experience monitoring module 1002 obtains application type information and link quality information, and generates a service application list. By using the service application list, the application grouping module 1001 obtains a service application type, where the service application type is a CRM conference application type. The application grouping module 1001 is set with measurement indicators of a link quality requirement of the CRM application type as follows: A delay indicator range is [0, 500], and a unit is millisecond; and a packet loss rate indicator range is [0, 10], and a unit is ‰. A correspondence between the three application type groups of the enterprise and the measurement indicators of the link quality requirements of the three application type groups is as follows: 1. Measurement indicators of the link quality requirement corresponding to the experience guarantee type group are as follows: A delay indicator range is [0,80], and a unit is millisecond; and a packet loss rate indicator range is [0, 1], and a unit is ‰. 2. Measurement indicators of the link quality requirement corresponding to the function guarantee type group are as follows: A delay indicator range is [0, 400], and a unit is millisecond; and a packet loss rate indicator range is [0, 20], and a unit is ‰. 3. Measurement indicators of the link quality requirement corresponding to the data transmission type group are as follows: A delay indicator range is [0, 800], and a unit is millisecond; and a packet loss rate indicator range is [0, 100], and a unit is ‰. It can be known that the measurement indicator range of the link quality requirement of the CRM application type is within the measurement indicator range of the link quality requirement of the application type group, that is, the function guarantee type group. Therefore, the foregoing service application type should be grouped into the function guarantee type group, and the application grouping module 1001 may group the service type into the function guarantee type group.

S603: Determine sending priorities based on the plurality of application type groups.

Operation and maintenance personnel may preset or customize a correspondence between the plurality of application type groups and the sending priorities in the controller 101. Because the application grouping module 1001 groups the plurality of service application types into the plurality of application type groups, the sending priorities of the application type groups may be determined based on the correspondence between the plurality of application type groups and the sending priorities, which are actually the sending priorities of the service application types. For example, a sending priority of the experience guarantee type group is high, a sending priority of the function guarantee type group is medium, and a sending priority of the data transmission type group is low. According to a support degree of the policy execution point device 1008 for a data processing priority, operation and maintenance personnel may further preset or customize, in the controller 101, a priority queue for sending service application data, for example, three priority queue levels: high, medium, and low. For example, if the sending priority of the experience guarantee type group is high, a data packet of a service application type in the experience guarantee type group enters a high-priority queue; or if the sending priority of the function guarantee type group is high, a data packet of a service application type in the function guarantee type group enters a high-priority queue.

S605: Separately determine at least one link for the plurality of application type groups based on link quality requirements of the plurality of application type groups and link quality information of a plurality of links.

The experience monitoring module 1002 obtains application type information and link quality information, and may generate the service application list and the list of quality information of a plurality of links. The list of quality information of a plurality of links includes: a sequence number, a link name, a link type, a link quality information type, and a corresponding value. The link quality information type includes: a bandwidth, a packet loss rate, a jitter, a delay, or a comprehensive measurement indicator. The comprehensive measurement indicator refers to a calculated value obtained by applying values of the packet loss rate, the jitter, and the delay into a calculation formula. For example, a formula for calculating the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. The link quality may be measured more comprehensively by using the comprehensive measurement indicator.

It should be noted that, the experience monitoring module 1002 and the application grouping module 1001 need to use link quality and measurement indicators of link quality requirements of service application types that are defined and calculated in a same manner. For example, if the experience monitoring module 1002 is set to use a comprehensive measurement indicator as the link quality information for measuring the link quality, the application grouping module 1001 also needs to use a comprehensive measurement indicator as a measurement indicator of the link quality requirement of the service application type, and calculation formulas of the comprehensive measurement indicators need to be completely the same.

In some embodiments, the experience monitoring module 1002 is set to use a comprehensive measurement indicator as link quality information of the link. The experience monitoring module 1002 obtains the link quality information of the link A. The link quality information is specifically as follows: The comprehensive measurement indicator is 8860. The experience monitoring module 1002 obtains, from the controller 101, a correspondence between a plurality of application type groups and measurement indicators of link quality requirements. For example, as specified by the enterprise, a measurement indicator range of a link quality requirement corresponding to the experience guarantee type group is [8820, 9000], a measurement indicator range of a link quality requirement corresponding to the function guarantee type group is [8580, 9000], and a measurement indicator range of a link quality requirement corresponding to the data transmission type group is [8100, 9000]. The experience monitoring module 1002 compares a comprehensive measurement indicator in the link quality information of the link A with the measurement indicators of the link quality requirements of the plurality of application type groups. Because the comprehensive measurement indicator of the link A is 8860, the link A satisfies the link quality requirements of the experience guarantee type group, the function guarantee type group, and the data transmission type group.

In some embodiments, the experience monitoring module 1002 is set to use indicators delay and packet loss rate in the link quality information as measurement indicators of the link quality. The experience monitoring module 1002 obtains the link quality information of the link A. The link quality information of the link A is: a delay of 500 milliseconds, and a packet loss rate of 60‰. The experience monitoring module 1002 obtains, from the controller 101, a correspondence between a plurality of application type groups and measurement indicators of link quality requirements. For example, the measurement indicator range of the link quality requirement of the experience guarantee type group specified by the enterprise is as follows: A delay indicator is [0, 80], and a unit is millisecond; and a packet loss rate indicator range is [0, 1], and a unit is ‰. Measurement indicators of the link quality requirement of the function guarantee type group are as follows: A delay indicator range is [0, 400], and a unit is millisecond; and a packet loss rate indicator range is [0, 20], and a unit is ‰. Measurement indicators of the link quality requirement of the data transmission type group are as follows: A delay indicator range is [0, 800], and a unit is millisecond; and a packet loss rate indicator range is [0, 100], and a unit is ‰. The experience monitoring module 1002 compares the indicators delay and packet loss rate in the link quality information of the link A with the measurement indicators of the link quality requirements of the plurality of application type groups. The delay value of the link A is 500 milliseconds and does not satisfy the delay indicator ranges of the link quality requirements of the experience guarantee type group and the function guarantee type group, but satisfies the delay indicator range of the link quality requirement of the data transmission type group. The packet loss rate indicator of the link A is 60‰ and does not satisfy the packet loss rate indicator ranges of the link quality requirements of the experience guarantee type group and the function guarantee type group, but satisfies the delay indicator range of the link quality requirement of the data transmission type group. Therefore, the link A does not satisfy the link quality requirements of the experience guarantee type group and the function guarantee type group, but satisfies the link quality requirement of the data transmission type group. In this case, the link A may be marked as not satisfying the link quality requirements of the experience guarantee type group and the function guarantee type group, and satisfying the link quality requirement of the data transmission type group. In some embodiments, for a link marked as not satisfied, the not satisfied mark of the link may be further marked based on a degree of proximity between a measurement indicator of link quality information of the link and a measurement indicator of a link quality requirement of an application type group. For example, a proximity degree formula of the measurement indicator is defined as follows: a ratio of an absolute value of a difference between the indicator of the link quality information of the link and the measurement indicator of the link quality requirement of the application type group to the measurement indicator of the link quality requirement of the application type group. For example, if the ratio is less than 0.01, it may be marked as not satisfied—extremely close; if the ratio is greater than or equal to 0.01 and less than 0.05, it may be marked as not satisfied—relatively close; and if the ratio is greater than or equal to 0.05, it may be marked as not satisfied—not close. By further marking the not satisfied mark of the link, link selection may be performed when there are no sufficient links that satisfy the measurement indicator of the link quality requirement of the application type group.

According to the foregoing method, the experience monitoring module 1002 may mark a satisfaction degree of each link based on link quality information of the link and the measurement indicator of the link quality requirement of the application type group, and the controller 101 may determine a satisfaction degree of each link for the link quality requirement of the application type group based on the mark.

S607: Separately determine network configurations for the plurality of application type groups based on the at least one link separately determined for the plurality of application type groups, the sending priorities of the plurality of application type groups, the link quality requirements of the plurality of application type groups, and a configuration decision engine.

According to the foregoing method, for the service applications of the plurality of application type groups, the controller 101 has separately determined the at least one link for the plurality of application type groups, the sending priorities of the plurality of application type groups, and the link quality requirements of the plurality of application type groups. The configuration decision module 1003 may obtain the foregoing information and use the foregoing information as an input condition. The configuration decision module 1003 has a configuration decision engine, and a function of the configuration decision engine is to output one or more network configurations for the plurality of application type groups based on the foregoing information and through calculation of the engine. The network configuration includes: link information selected for data packet sending of the service application, a sending priority set for the data packet, a bandwidth configuration of the link, a QoS configuration, and/or a traffic shaping configuration of the link. The link information includes: a physical port corresponding to the link, and a logical port, that is, an IP address corresponding to the port. In some embodiments, the configuration decision engine is a computing engine designed based on a greedy algorithm. The greedy algorithm is also referred to as a greedy algorithm, and is a common method for finding an optimal solution problem. The method pattern generally divides a solving process into several steps, and each step applies a greedy algorithm principle, that is, selects optimal selection in a current state or local most advantageous selection, thereby hoping that a finally derived result is also an optimal solution. For example, the configuration decision module 1003 needs to determine the network configurations for the plurality of service application groups. The configuration decision module 1003 uses the at least one link separately determined for the plurality of application type groups, the sending priorities of the plurality of application type groups, and measurement indicators of the link quality requirements of the plurality of application type groups as greedy conditions, and finally obtains a global recommended network configuration in a manner of obtaining a local optimal policy in each step. The greedy conditions may further include measurement indicators of user experience requirements of the plurality of application type groups and a cost requirement of the link. In some embodiments, the configuration decision module 1003 separately determines the network configurations for the plurality of application type groups based on the at least one link separately determined for the plurality of application type groups, the sending priorities of the plurality of application type groups, the link quality requirements of the plurality of application type groups, the user experience requirements of the plurality of application type groups, cost requirements of the plurality of links, and a policy recommendation engine.

S609: Deliver the network configurations to a policy execution point device.

The configuration validation module 1004 delivers the network configurations decided in S213 to the policy execution point device 1008.

Figure 5:
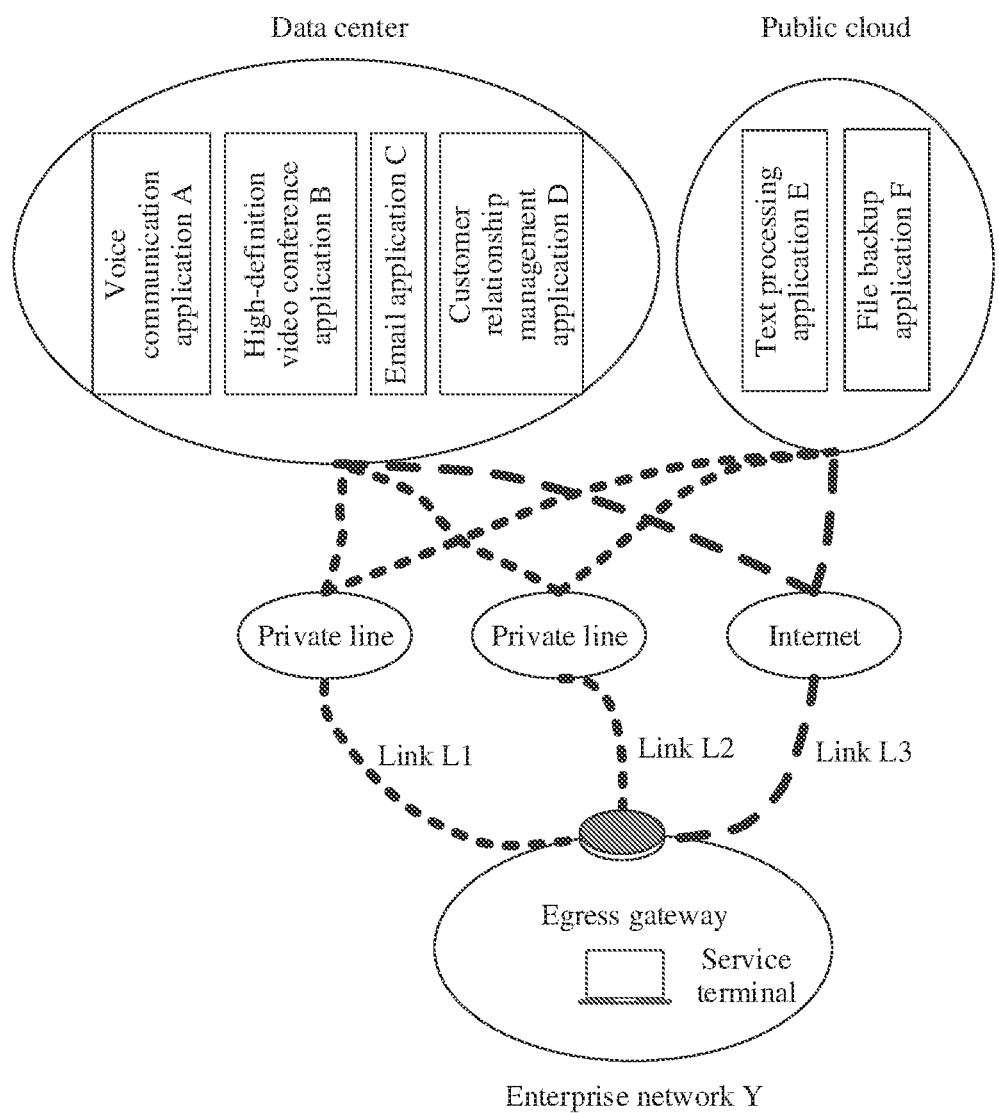
FIG. 5 is a schematic scenario diagram of an enterprise network Y of a method for guaranteeing service application experience according to an embodiment of this application.

FIG. 5 is a schematic scenario diagram of an enterprise network Y of a method for guaranteeing service application experience according to an embodiment of this application. With reference to a specific scenario and the flowchart shown in FIG. 4, in the embodiment shown in FIG. 5, a specific method is as follows:

First, according to S601 in FIG. 4, group a plurality of service application types into a plurality of application type groups based on link quality requirements of the plurality of service application types. The specific method is as follows:

As shown in FIG. 5, there are six commonly used service application types in the enterprise network Y, which are respectively a voice communication application A, a high-definition video conference application B, an email application C, a customer relationship management application D a text processing application E, and a file backup application F. Operation and maintenance personnel can use service applications that have been deployed and purchased in the enterprise network as commonly used service applications in the enterprise network. Operation and maintenance personnel may alternatively obtain a plurality of service application types in the network by using a service application identification device or system deployed in the enterprise network, and operation and maintenance personnel further identify a commonly used service application type. For a specific method, refer to S201 and S203 in FIG. 3A.

For each of the six commonly used service application types, operation and maintenance personnel provide a link quality requirement of the service application type. In this embodiment, operation and maintenance personnel set that a comprehensive measurement indicator is used as a measurement indicator of a link quality requirement, and determine that a calculation formula of the comprehensive measurement indicator is as follows: Comprehensive measurement indicator=9000−(D+J+L), where D indicates the value of the delay, a unit of the delay is millisecond, J indicates the value of the jitter, a unit of the jitter is millisecond, L indicates the value of the packet loss rate, and a unit of the packet loss rate is ‰. Operation and maintenance personnel obtain the link quality requirements of the six commonly used service application types through calculation according to the calculation formula for the comprehensive measurement indicator. According to the foregoing calculation formula, the link quality requirements of the six commonly used service application types are as follows:

(1) Voice communication application A: A delay indicator range is [0, 150], and a unit is millisecond; a packet loss rate indicator range is [0, 30], and a unit is ‰; and a jitter indicator range is [0, 100], and a unit is millisecond. Based on the calculation formula for the comprehensive measurement indicator, a value range of a calculation result is [8720, 9000].

(2) High-definition video conference application B: A delay indicator range is [0, 80], and a unit is millisecond; a packet loss rate indicator range is [0, 1], and a unit is ‰; and a jitter indicator range is [0, 50], and a unit is millisecond. Based on the calculation formula for the comprehensive measurement indicator, a value range of a calculation result is [8869, 9000].

(3) Email application C: A delay indicator range is [0, 500], and a unit is millisecond; a packet loss rate indicator range is [0, 200], and a unit is ‰; and for a non-real-time service application, a jitter indicator may be a fixed value, for example, 1000, and a unit is millisecond. Based on the calculation formula for the comprehensive measurement indicator, a value range of a calculation result is [7300, 9000].

(4) Customer relationship management application D: A delay indicator range is [0, 1000], and a unit is millisecond; a packet loss rate indicator range is [0, 200], and a unit is ‰; and for a non-real-time service application, a jitter indicator may be a fixed value, for example, 1000, and a unit is millisecond. Based on the calculation formula for the comprehensive measurement indicator, a value range of a calculation result is [6800, 9000].

(5) Text processing application E: A delay indicator range is [0, 200], and a unit is millisecond; a packet loss rate indicator range is [0, 200], and a unit is ‰; and for a non-real-time service application, a jitter indicator may be a fixed value, for example, 1000, and a unit is millisecond. Based on the calculation formula for the comprehensive measurement indicator, a value range of a calculation result is [7600, 9000].

(6) File backup application F: A delay indicator range is [0, 2000], and a unit is millisecond; a packet loss rate indicator range is [0, 100], and a unit is ‰; and for a non-real-time service application, a jitter indicator may be a fixed value, for example, 1000, and a unit is millisecond. Based on the calculation formula for the comprehensive measurement indicator, a value range of a calculation result is [5900, 9000].

Based on characteristics of services of the enterprise network Y, operation and maintenance personnel group the six service application types of the enterprise network Y into three application type groups based on the link quality requirements, which are respectively: (1) an experience guarantee type group, where a service application type in the application type group needs to be provided with a bandwidth guarantee and an extremely low delay and packet loss rate; (2) a function guarantee type group, where a service application type in the application type group needs to be provided with a bandwidth guarantee and a relatively low delay and packet loss rate; and (3) a data transmission type group, where a service application type in the application type group needs to be provided with a bandwidth guarantee and a general delay and packet loss rate.

Operation and maintenance personnel further identify a typical service application type in each service application type group: (1) A typical service application type in the experience guarantee type group is the voice communication application A. (2) A typical service application type in the function guarantee type group is the customer relationship management application D. (3) A typical service application type in the data transmission type group is the file backup application F. Operation and maintenance personnel set a correspondence between the service application type group and the service application type on the controller 101. In this way, a measurement indicator of a link quality requirement of the typical service application type may be used as a measurement indicator of a link quality requirement of the service application type group. Measurement indicators of link quality requirements of the three application type groups are as follows: (1) A measurement indicator of a link quality requirement of the experience guarantee type is [8720, 9000]. (2) A measurement indicator of a link quality requirement of the function guarantee type group is [6800, 9000]. (3) A measurement indicator of a link quality requirement of the data transmission type group is [5900, 9000]. In this way, the application grouping module 1001 obtains a correspondence between the application type group and the measurement indicator of the link quality requirement of the user experience requirement of the application type group.

The application grouping module 1001 obtains measurement indicators of link quality requirements of the six service application types, and based on a correspondence between the three service application type groups and measurement indicators of link quality requirements of the three application type groups, compares the measurement indicators of the link quality requirements of the six service application types with the correspondence. It should be noted that boundary values of two measurement indicators needs to be compared, and whether the link quality requirement of the service application type group can represent the link quality requirement of the service application type needs to be considered. For example, when a comprehensive measurement indicator is used as the measurement indicator of the link quality requirement, a meaning of the indicator is that a larger value indicates better link quality, a maximum value does not exceed 9000, and a minimum value of the measurement indicator needs to be compared. For example, the measurement indicator of the link quality requirement of the high-definition video conference application B is [8869, 9000], and is compared with the measurement indicators of the link quality requirements of the three application type groups. First, the measurement indicator of the link quality requirement of the high-definition video conference application B is compared with the measurement indicator of the link quality requirement of the experience guarantee type. The measurement indicator of the link quality requirement of the experience guarantee type is [8720, 9000]. The minimum value of the measurement indicator of the link quality requirement of the high-definition video conference application B is 8869, which is 149 greater than the minimum value 8720 of the measurement indicator of the link quality requirement of the experience guarantee type group. This indicates that the link quality requirement of the high-definition video conference application B is higher than that of the typical service application of the experience guarantee type, and complies with the definition of the experience guarantee type. Therefore, the high-definition video conference application B belongs to the experience guarantee type. Then, comparison continues to be performed on the measurement indicators of the link quality requirements of the remaining two application type groups. The measurement indicator of the link quality requirement of the high-definition video conference application B is compared with the measurement indicator of the link quality requirement of the function guarantee type group. The measurement indicator of the link quality requirement of the function guarantee type group is [7600, 9000], and the minimum value is 7600. The minimum value of the measurement indicator of the link quality requirement of the high-definition video conference application B is 8869, which is 1269 greater than the minimum value 7600 of the measurement indicator of the link quality requirement of the function guarantee type group. This indicates that the link quality requirement for the high-definition video conference application B is higher than that of the typical service application of the function guarantee type group. In this case, the definition of the function guarantee type group needs to be considered. If the high-definition video conference application B is grouped into the function guarantee type group, because the link quality requirement of the function guarantee type group is greatly different from that of the high-definition video conference application B, the link quality requirement of the function guarantee type group cannot represent the link quality requirement of the high-definition video conference application B. Therefore, the link quality requirement of the function guarantee type group cannot satisfy the link quality requirement of the high-definition video conference application B, and the high-definition video conference application B does not belong to the function guarantee type group. Similarly, it may be concluded that the high-definition video conference application B does not belong to the data transmission type group. According to the foregoing comparison method, the application grouping module 1001 may obtain the application type groups of the six service application types, that is, grouping results of the service application types. The grouping results are as follows: (1) The voice communication application A and the high-definition video conference application B belong to the experience guarantee type group. (2) The email application C, the customer relationship management application D, and the text processing application E belong to the function guarantee type group. (3) The file backup application F belongs to the data transmission type group.

Then, according to S603 in FIG. 4, determine sending priorities based on the plurality of application type groups. The specific method is as follows:

Operation and maintenance personnel may preset a correspondence between the three application type groups and the sending priorities in the controller 101. Sending priorities of the three application type groups may be determined based on the correspondence between the three application type groups and the sending priorities, which are actually sending priorities of the six service application types. The sending priorities of the three application type groups are as follows: (1) The voice communication application A and the high-definition video conference application B belong to the experience guarantee type group, and a sending priority of the experience guarantee type group is high. (2) The email application C, the customer relationship management application D, and the text processing application E belong to the function guarantee type group, and a sending priority of the function guarantee type group is high. (3) The file backup application F belongs to the data transmission type group, and a sending priority of the data transmission type group is medium.

Then, according to S605 in FIG. 4, separately determine at least one link for the plurality of application type groups based on link quality requirements of the plurality of application type groups and link quality information of a plurality of links. The specific method is as follows:

It should be noted that the experience monitoring module 1002 and the application grouping module 1001 of the controller 101 need to use a same measurement indicator definition and calculation method to calculate link quality information of a plurality of links and the measurement indicator of the link quality requirement of the application type group. For example, in this embodiment, the experience monitoring module 1002 is set to use a comprehensive measurement indicator as the link quality information for measuring the link quality, the application grouping module 1001 also uses a comprehensive measurement indicator as a measurement indicator of the link quality requirement of the application type group, and calculation formulas of the comprehensive measurement indicators are completely the same. The experience monitoring module 1002 compares the link quality information of the plurality of links with the measurement indicators of the link quality requirements of the plurality of application type groups, to obtain satisfaction degrees of the plurality of links for the link quality requirements of the plurality of application type groups, and marks the satisfaction degrees.

The experience monitoring module 1002 obtains link quality information of three links in the network: (1) Link quality information of a link L1 is: A comprehensive measurement indicator is 8880. (2) Link quality information of a link L2 is: A comprehensive measurement indicator is 8000. (3) Link quality information of a link L3 is: A comprehensive measurement indicator is 5200. Measurement indicators of link quality requirements of the three application type groups are as follows: (1) A measurement indicator of a link quality requirement of the experience guarantee type is [8720, 9000]. (2) A measurement indicator of a link quality requirement of the function guarantee type group is [6800, 9000]. (3) A measurement indicator of a link quality requirement of the data transmission type group is [5900, 9000]. At least one link is separately determined for the three application type groups based on the link quality requirements of the three application type groups and the link quality information of the three links. For example, a link quality measurement indicator of the link L1 is 8880, and the measurement indicator value is greater than the minimum values of the measurement indicators of the link quality requirements of the three application type groups, which indicates that the link quality of the link L1 is higher than the link quality requirements of the three application type groups, and the link L1 is marked as satisfying the link quality requirements of the experience guarantee type group, the function guarantee type group, and the data transmission type group. For example, a link quality measurement indicator of the link L2 is 8000, and the measurement indicator value is greater than the minimum values of the measurement indicators of the link quality requirements of the function guarantee type group and the data transmission type group, which indicates that the link quality of the link L2 is higher than the link quality requirements of the function guarantee type group and the data transmission type group, and the link L2 is marked as satisfying the link quality requirements of the function guarantee type group and the data transmission type group. For example, a link quality measurement indicator of the link L3 is 5200, and the measurement indicator value is less than the minimum values of the measurement indicators of the link quality requirements of the three application type groups, which indicates that the link quality of the link L3 is lower than the link quality requirements of the three application type groups, and the link L3 is marked as not satisfying the link quality requirements of the experience guarantee type group, the function guarantee type group, and the data transmission type group. In some embodiments, for a link marked as not satisfied, the not satisfied mark of the link may be further marked based on a degree of proximity between a measurement indicator of link quality information of the link and a measurement indicator of a link quality requirement of an application type group. For example, according to a formula: a ratio of an absolute value of a difference between the indicator of the link quality information of the link and the measurement indicator of the link quality requirement of the application type group to the measurement indicator of the link quality requirement of the application type group. For example, if the ratio is less than 0.05, it may be marked as not satisfied—extremely close; if the ratio is greater than or equal to 0.05 and less than 0.15, it may be marked as not satisfied—relatively close; and if the ratio is greater than or equal to 0.15, it may be marked as not satisfied—not close. In this embodiment, the not satisfied mark of the link L3 is further marked. According to the foregoing calculation formula for the proximity degree, proximity degrees between the link quality of the link L3 and the link quality requirements of the three application type groups may be obtained: (1) The proximity degree between the link quality of the link L3 and the link quality requirement of the experience guarantee type group is 0.40, and may be marked as "not satisfied—not close" according to a determining standard. (2) The proximity degree between the link quality of the link L3 and the link quality requirement of the function guarantee type group is 0.24, and may be marked as "not satisfied—not close" according to the determining standard. (3) The proximity degree between the link quality of the link L3 and the link quality requirement of the data transmission type group is 0.12, and may be marked as not satisfied—relatively close according to the determining standard. By further marking the not satisfied mark of the link, link selection may be performed when there are no sufficient links that satisfy the measurement indicator of the link quality requirement of the application type group.

Then, according to S607 in FIG. 4, separately determine network configurations for the plurality of application type groups based on the at least one link separately determined for the plurality of application type groups, the sending priorities of the plurality of application type groups, the link quality requirements of the plurality of application type groups, and a configuration decision engine. The specific method is as follows:

The configuration decision module 1003 may obtain the foregoing information and use the foregoing information as an input condition. The configuration decision module 1003 has a configuration decision engine, and a function of the configuration decision engine is to output one or more network configurations for the plurality of application type groups based on the foregoing information and through calculation of the engine. The network configuration includes: link information selected for data packet sending of the service application, a sending priority set for the data packet, a bandwidth configuration of the link, a QoS configuration, and/or a traffic shaping configuration of the link. The link information includes: a physical port corresponding to the link, and a logical port, that is, an IP address corresponding to the port. In this embodiment, the configuration decision engine is a computing engine designed based on a greedy algorithm. The greedy algorithm is also referred to as a greedy algorithm, and is a common method for finding an optimal solution problem. The method pattern generally divides a solving process into several steps, and each step applies a greedy algorithm principle, that is, selects optimal selection in a current state or local most advantageous selection, thereby hoping that a finally derived result is also an optimal solution. The configuration decision module 1003 needs to determine network configurations for the six service applications of the three application type groups. The configuration decision module 1003 uses the at least one link separately determined for the three application type groups, the sending priorities of the three application type groups, and the measurement indicators of the link quality requirements of the three application type groups as greedy conditions, and finally obtains a global recommended network configuration in a manner of obtaining a local optimal policy in each step. In this embodiment, through decision by the configuration decision module 1003, recommended network configurations for the three application type groups are as follows: (1) The network configuration of the experience guarantee type group is as follows: The link L1 is selected as a data sending link, and a data sending priority is high. (2) The network configuration of the function guarantee type group is as follows: The link L2 is selected as a data sending link, and a data sending priority is high. (3) The network configuration of the data transmission type group is as follows: The link L3 is selected as a data sending link, and a data sending priority is low. The recommended network configurations of the three application type groups further include bandwidth configurations, QoS configurations, and parameters. Meanings of the parameters belong to the conventional technology and are irrelevant to the method in this application, and are not shown one by one herein.

Finally, according to S609 in FIG. 4, deliver the network configurations to a policy execution point device.

The configuration validation module 1004 delivers the network configurations to the policy execution point device 1008.

Figure 6:
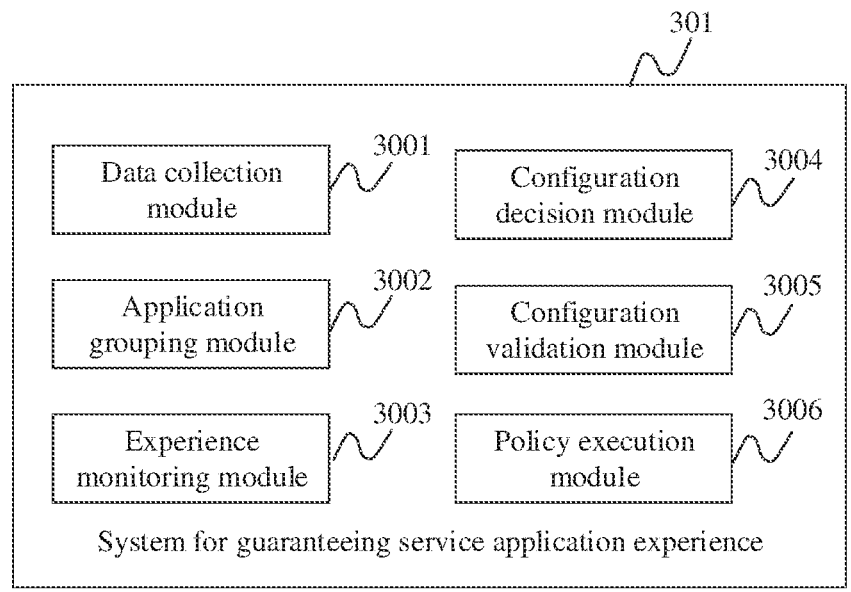
FIG. 6 is an architectural diagram of a system for guaranteeing service application experience according to an embodiment of this application.

FIG. 6 is an architectural diagram of a system 301 for guaranteeing service application experience according to an embodiment of this application. The system is applied to a network scenario in which a service application is accessed. As shown in FIG. 6, the system 301 for guaranteeing service application experience includes: a data collection module 3001, an application grouping module 3002, an experience monitoring module 3003, a configuration decision module 3004, a configuration validation module 3005, and a policy execution module 3006.

The data collection module 3001 is responsible for obtaining information related to service application type information and link quality information of a data packet in a link, and may further synchronize, through an API open interface, information collected and analyzed by a third-party platform. For example, the data collection module 3001 may be interconnected with the experience awareness platform 103 of the service application A shown in FIG. 2, to obtain the user experience information of the service application A. The data collection module 3001 may be deployed in a serial mode or deployed in a bypass mode on a link through which a data packet passes during transmission, and may collect, parse, and analyze the data packet.

The application grouping module 3002 is responsible for grouping a plurality of identified service application types into a plurality of application type groups based on a correspondence between the plurality of identified service application types and the plurality of application type groups.

The experience monitoring module 3003 is responsible for monitoring link quality statuses of the plurality of links in the network in real time or periodically and user experience statuses of the plurality of service application types.

The configuration decision module 3004 is responsible for making decisions on network configurations for data packet sending and experience guarantee of the plurality of application type groups.

The configuration validation module 3005 is responsible for delivering the decided network configurations to a policy execution point device 3006.

The policy execution module 3006 is responsible for executing the network configurations delivered by the configuration validation module 3005 and forwarding data to a specified link.

In some embodiments, the system shown in FIG. 6 may be the controller 101 in the foregoing embodiment, and implements all content in the embodiment shown in FIG. 3A and FIG. 3B. In some embodiments, the data collection module 3001 implements all functions of the data collection point device 1007 in FIG. 2 and supports interconnection with a third-party platform by using an API open interface; the application grouping module 3002 implements all functions of the application grouping module 1001 in FIG. 2; the experience monitoring module 3003 implements all functions of the experience monitoring module 1002 in FIG. 2; the configuration decision module 3004 implements all functions of the configuration decision module 1003 in FIG. 2; the configuration validation module 3005 implements all functions of the configuration validation module 1004 in FIG. 2; and the policy execution module 3006 implements all functions of the policy execution point device 1008 in FIG. 2. For specific implementations, refer to the working procedure in FIG. 3A and FIG. 3B. For brevity, details are not described again.

The modules shown in FIG. 6 may be software functional modules or virtual functional modules, or may be hardware modules. In some embodiments, a plurality of modules in these modules may be integrated together, and are represented as one module. In terms of physical locations, the plurality of modules may be on a same hardware device, or may be distributed on different hardware devices.

Figure 7:
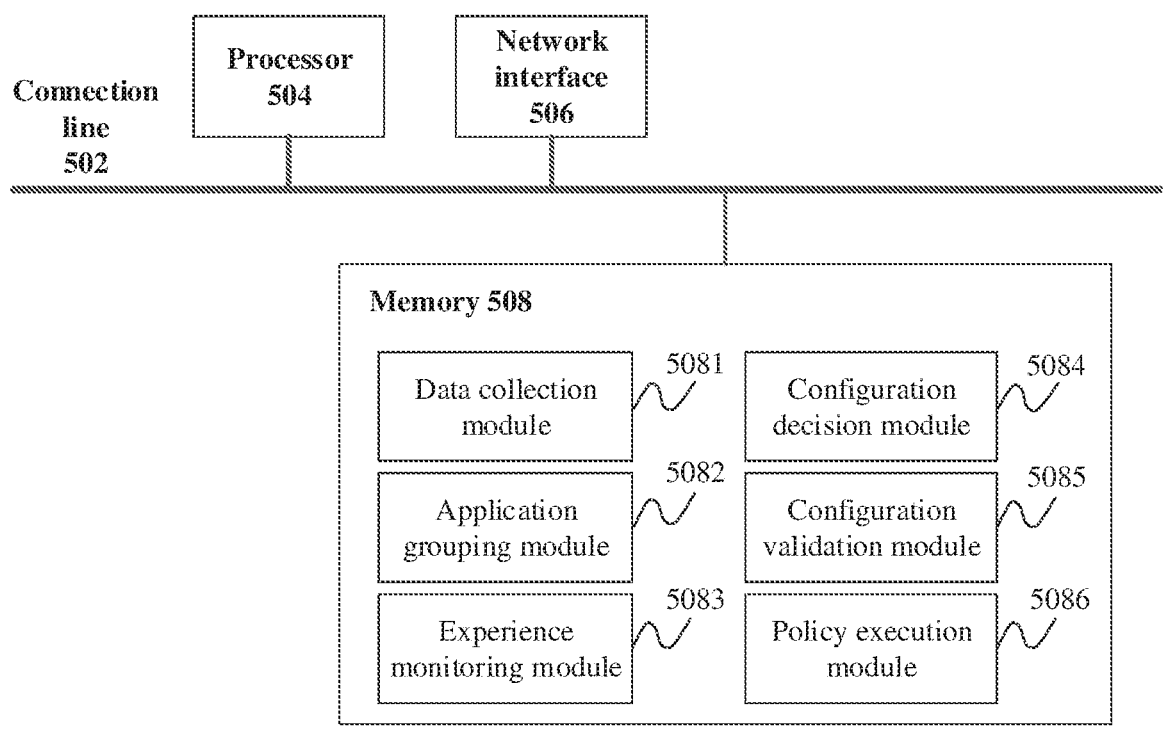
FIG. 7 is a schematic diagram of a structure of a system for guaranteeing service application experience according to an embodiment of this application.

FIG. 7 is a schematic diagram of a structure according to an embodiment of this application. The system shown in FIG. 7 may be the controller 101 in the foregoing embodiment, and implement all content in the embodiment shown in FIG. 3A and FIG. 3B. The system is applied to a network scenario in which a service application is accessed. As shown in FIG. 7, the system includes a processor 504, a network interface 506, a memory 508, and various connection lines 502 that connect the processor 504, the network interface 506, and the memory 508. The network interface 506 is used by the system to communicate with the outside, and the memory 508 is configured to store a program module and data. The program module includes a data collection module 5081, an application grouping module 5082, an experience monitoring module 5083, a configuration decision module 5084, a configuration validation module 5085, and a policy execution module 5086. In some embodiments, the modules shown in FIG. 6 are software modules, and the memory 508 in FIG. 7 includes the software modules shown in FIG. 6.

The memory 508 may include a high-speed random access memory (RAM), and may further include a non-volatile memory, for example, at least one magnetic disk memory. The processor 504 may invoke program code stored in the memory 508 to perform the method shown in the foregoing embodiment. For specific execution, refer to the foregoing method embodiment. Details are not described herein again. The processor 504 may be a central processing unit (CPU), a network processor (NP), or another physical chip having a processing capability.

In conclusion, this application provides a method and a system for guaranteeing service application experience. A plurality of service application types are grouped into a plurality of application type groups based on link quality requirements of the plurality of service application types; sending priorities are determined based on the plurality of application type groups; at least one link is separately determined for the plurality of application type groups based on link quality requirements of the plurality of application type groups and link quality information of a plurality of links in a network; network configurations are separately determined for the plurality of application type groups based on the at least one link separately determined for the plurality of application type groups, the sending priorities of the plurality of application type groups, the link quality requirements of the plurality of application type groups, and a configuration decision engine; the network configurations are delivered to a policy execution point device; it is determined, based on link quality information of links involved in the network configurations separately determined for the plurality of application type groups, whether execution effects of the network configurations are capable of satisfying the link quality requirements of the plurality of application type groups; and new network configurations are separately determined for the plurality of application type groups based on the at least one link separately determined for the plurality of application type groups, the sending priorities of the plurality of application type groups, the link quality requirements of the plurality of application type groups, and a policy recommendation engine when the execution effects of the network configurations are incapable of satisfying the link quality requirements of the plurality of application type groups. According to the foregoing method, network configurations based on application type groups may be determined based on a configuration decision engine by using a plurality of application type groups into which a plurality of service applications are grouped, link quality requirements and/or user experience requirements of the plurality of application type groups, and a plurality of links in a network. This not only reduces complexity of network configuration operation and maintenance, but also improves operation and maintenance efficiency. In addition, a network link satisfaction degree is determined based on the link quality requirements and the user experience requirements, thereby improving a capability of ensuring service application experience of the network configurations.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method comprises:
grouping a plurality of service application types into a plurality of application type groups based on link quality requirements of the plurality of service application types;
for each application type group of the plurality of application type groups, determining a sending priority of the respective application type group;
separately determining, for each application type group of the plurality of application type groups, at least one link for the respective application type group based on a link quality requirement of the respective application type group and link quality information of a plurality of links in a network;
separately determining, for each application type group of the plurality of application type groups, a network configuration for the respective application type group based on the at least one link separately determined for the respective application type group, the respective sending priority of the respective application type group, the respective link quality requirement of the respective application type group, and a configuration decision engine, to determine network configurations of the plurality of application type groups; and
delivering the network configurations of the plurality of application type groups to a first device.

2. The method according to claim 1, wherein grouping the plurality of service application types into the plurality of application type groups based on the link quality requirements of the plurality of service application types comprises:
grouping the plurality of service application types into the plurality of application type groups based on the link quality requirements of the plurality of service application types and a correspondence between the plurality of application type groups and the respective link quality requirement of each of the plurality of application type groups.

3. The method according to claim 1, wherein grouping the plurality of service application types into the plurality of application type groups based on the link quality requirements of the plurality of service application types comprises:
grouping the plurality of service application types into the plurality of application type groups based on the link quality requirements of the plurality of service application types, user experience requirements of the plurality of service application types, and a correspondence between the plurality of application type groups and the respective link quality requirement of each of the plurality of application type groups and user experience requirements of the plurality of application type groups.

4. The method according to claim 1, wherein separately determining, for each application type group of the plurality of application type groups, the network configuration for the respective application type group based on the at least one link separately determined for the respective application type group, the respective sending priority of the respective application type group, the respective link quality requirement of the respective application type group, and the configuration decision engine comprises:
separately determining, for each application type group of the plurality of application type groups, the network configuration for the respective application type group based on the at least one link separately determined for the respective application type group, the respective sending priority of the respective application type group, the respective link quality requirements of the respective application type group, a user experience requirement of the respective application type group, a cost requirement of the at least one link separately determined for the respective application type group, and the configuration decision engine.

5. The method according to claim 1, further comprising:
determining, based on link quality information of links corresponding to the network configurations of the plurality of application type groups, whether execution effects of the network configurations of the plurality of application type groups are capable of satisfying the respective link quality requirement of each of the plurality of application type groups; and
separately determining, when the execution effects of the network configurations of the plurality of application type groups are incapable of satisfying the respective link quality requirement of each of the plurality of application type groups, a new network configuration for each of the plurality of application type groups based on the at least one link separately determined for the respective application type group, the respective sending priority of the respective application type group, the respective link quality requirement of the respective application type group, and the configuration decision engine.

6. The method according to claim 5, wherein determining, based on the link quality information of the links corresponding to the network configurations of the plurality of application type groups, whether execution effects of the network configurations of the plurality of application type groups are capable of satisfying the respective link quality requirement of each of the plurality of application type groups comprises:
determining, based on the link quality information of the links corresponding to the network configurations of the plurality of application type groups and user experience information of a plurality of service applications of the plurality of service application types, whether the execution effects of the network configurations of the plurality of application type groups are capable of satisfying the respective link quality requirement of each of the plurality of application type groups and user experience requirements of the plurality of application type groups.

7. The method according to claim 5, wherein separately determining, when the execution effects of the network configurations of the plurality of application type groups are incapable of satisfying the respective link quality requirement of each of the plurality of application type groups, the new network configuration for each of the plurality of application type groups based on the at least one link separately determined for the respective application type group, the respective sending priority of the respective application type group, the respective link quality requirement of the respective application type group, and the configuration decision engine comprises:
  when the execution effects of the network configurations of the plurality of application type groups are incapable of satisfying the respective link quality requirement of each of the plurality of application type groups and user experience requirements of the plurality of application type groups, separately determining a new network configuration for each of the plurality of application type groups based on the at least one link separately determined for the respective application type group, the respective sending priority of the plurality of application type groups, the respective link quality requirement of the respective application type group, and the configuration decision engine.

8. The method according to claim 5, wherein separately determining the new network configuration for each of the plurality of application type groups based on the at least one link separately determined for the respective application type group, the respective sending priority of the respective application type group, the respective link quality requirement of the respective application type group, and the configuration decision engine comprises:
  separately determining the new network configuration for each of the plurality of application type groups based on the at least one link separately determined for the respective application type group, the respective sending priority of the respective application type group, the respective link quality requirement of the respective application type group, a user experience requirement of the respective application type group, a cost requirement of the at least one link separately determined for the respective application type group, and the configuration decision engine.

9. An apparatus, comprising:
  at least one processor;
  at least one non-transitory computer-readable storage medium storing a program to be executed by the at least one processor, the program including instructions to:
  group a plurality of service application types into a plurality of application type groups based on link quality requirements of the plurality of service application types;
  for each application type group of the plurality of application type groups, determine a sending priority of the respective application type group;
  separately determine, for each application type group of the plurality of application type groups, at least one link for the respective application type group based on a link quality requirement of the respective application type group and link quality information of a plurality of links in a network;
  separately determine, for each application type group of the plurality of application type groups, a network configuration for the respective application type group based on the at least one link separately determined for the respective application type group, the respective sending priority of the respective application type group, the respective link quality requirement of the respective application type group, and a configuration decision engine; and
  deliver the network configurations to a first device.

10. The apparatus according to claim 9, wherein the instructions further include instructions to:
  group the plurality of service application types into the plurality of application type groups based on the link quality requirements of the plurality of service application types and a correspondence between the plurality of application type groups and the respective link quality requirement of each of the plurality of application type groups.

11. The apparatus according to claim 9, wherein the instructions further include instructions to:
  group the plurality of service application types into the plurality of application type groups based on the link quality requirements of the plurality of service application types, user experience requirements of the plurality of service application types, and a correspondence between the plurality of application type groups and the respective link quality requirements of each of the plurality of application type groups and user experience requirements of the plurality of application type groups.

12. The apparatus according to claim 9, wherein the instructions further include instructions to:
  separately determine, for each application type group of the plurality of application type groups, the network configuration for the respective application type group based on the at least one link separately determined for the respective application type group, the respective sending priority of the respective application type groups, the respective link quality requirement of the respective application type group, a user experience requirement of the respective application type group, a cost requirement of the at least one link separately determined for the respective application type group, and the configuration decision engine.

13. The apparatus according to claim 9, wherein the instructions further include instructions to:
  determine, based on link quality information of links corresponding to the network configurations of the plurality of application type groups, whether execution effects of the network configurations of the plurality of application type groups are capable of satisfying the respective link quality requirement of each of the plurality of application type groups; and
  separately determine, when the execution effects of the network configurations of the plurality of application type groups are incapable of satisfying the respective link quality requirement of each of the plurality of application type groups, a new network configuration for each of the plurality of application type groups based on the at least one link separately determined for the respective application type group, the respective sending priority of the respective application type group, the respective link quality requirement of the respective application type group, and the configuration decision engine.

14. The apparatus according to claim 11, wherein the instructions further include instructions to:
  determine, based on the link quality information of the links corresponding to the network configurations of the plurality of application type groups and user experience information of a plurality of service applications of the plurality of service application types, whether the execution effects of the network configurations of the plurality of application type groups are capable of satisfying the respective link quality requirement of the plurality of application type groups and the user experience requirements of the plurality of application type groups.

15. The apparatus according to claim 11, wherein the instructions further include instructions to:
  when the execution effects of the network configurations of the plurality of application type groups are incapable of satisfying the respective link quality requirement of each of the plurality of application type groups and the user experience requirements of the plurality of application type groups, separately determine a new network configuration for each of the plurality of application type groups based on the at least one link separately determined for the respective application type groups, the respective sending priority of the respective application type group, the respective link quality requirement of respective application type group, and the configuration decision engine.

16. The apparatus according to claim 11, wherein the instructions further include instructions to:
  separately determine a new network configuration for each of the plurality of application type groups based on the at least one link separately determined for the respective application type group, the sending priority of the respective application type group, the respective link quality requirement of the respective application type group, the user experience requirement of the respective application type group, a cost requirement of the at least one link separately determined for the respective application type group, and the configuration decision engine.

17. A non-transitory computer readable storage medium storing a program that is executable by at least one processor, the program including instructions for:
  grouping a plurality of service application types into a plurality of application type groups based on link quality requirements of the plurality of service application types;
  for each application type group of the plurality of application type groups, determining a sending priority of the respective application type group;
  separately determining, for each application type group of the plurality of application type groups, at least one link for the respective application type group based on a link quality requirement of the respective application type group and link quality information of a plurality of links in a network;
  separately determining, for each application type group of the plurality of application type groups, a network configuration for the respective application type group based on the at least one link separately determined for the respective application type group, the respective sending priority of the respective application type group, the respective link quality requirement of the respective application type group, and a configuration decision engine, to determine network configurations of the plurality of application type groups; and
  delivering the network configurations of the plurality of application type groups to a first device.

18. The non-transitory computer readable storage medium according to claim 17, wherein grouping the plurality of service application types into the plurality of application type groups based on the link quality requirements of the plurality of service application types comprises:
  grouping the plurality of service application types into the plurality of application type groups based on the link quality requirements of the plurality of service application types and a correspondence between the plurality of application type groups and the respective link quality requirement of each of the plurality of application type groups.

19. The non-transitory computer readable storage medium according to claim 17, wherein grouping the plurality of service application types into the plurality of application type groups based on the link quality requirements of the plurality of service application types comprises:
  grouping the plurality of service application types into the plurality of application type groups based on the link quality requirements of the plurality of service application types, user experience requirements of the plurality of service application types, and a correspondence between the plurality of application type groups and the respective link quality requirement of each of the plurality of application type groups and user experience requirements of the plurality of application type groups.

20. The non-transitory computer readable storage medium according to claim 17, wherein separately determining, for each application type group of the plurality of application type groups, the network configuration for the respective application type group based on the at least one link separately determined for the respective-application type group, the respective sending priority of the respective application type group, the respective link quality requirement of the respective application type group, and the configuration decision engine comprises:
  separately determining, for each application type group of the plurality of application type groups, the network configuration for the respective application type group based on the at least one link separately determined for the respective application type group, the respective sending priority of the respective application type group, the respective link quality requirements of the respective application type group, a user experience requirement of the respective application type group, a cost requirement of the at least one link separately determined for the respective application type group, and the configuration decision engine.

* * * * *

UNITED STATES PATENT AND TRADEMARK OFFICE
CERTIFICATE OF CORRECTION

PATENT NO. : 11,985,049 B2
APPLICATION NO. : 18/185963
DATED : May 14, 2024
INVENTOR(S) : Dahu et al.

It is certified that error appears in the above-identified patent and that said Letters Patent is hereby corrected as shown below:

In the Claims

In Column 45, in Claim 15, Line 14, delete "respective" and insert -- the respective --.

Signed and Sealed this
Eighteenth Day of June, 2024

Katherine Kelly Vidal
*Director of the United States Patent and Trademark Office*